US010769411B2

(12) United States Patent
Grabner et al.

(10) Patent No.: US 10,769,411 B2
(45) Date of Patent: Sep. 8, 2020

(54) POSE ESTIMATION AND MODEL RETRIEVAL FOR OBJECTS IN IMAGES

(71) Applicant: QUALCOMM TECHNOLOGIES, INC., San Diego, CA (US)

(72) Inventors: Alexander Grabner, Styria (AT); Peter Michael Roth, Mooskirchen (AT); Vincent Lepetit, Talence (FR)

(73) Assignee: QUALCOMM TECHNOLOGIES, INC., San Diego, CA (US)

(*) Notice: Subject to any disclaimer, the term of this patent is extended or adjusted under 35 U.S.C. 154(b) by 92 days.

(21) Appl. No.: 15/946,669

(22) Filed: Apr. 5, 2018

(65) Prior Publication Data

US 2019/0147221 A1 May 16, 2019

Related U.S. Application Data

(60) Provisional application No. 62/586,449, filed on Nov. 15, 2017.

(51) Int. Cl.
| | |
|---|---|
| *G06K 9/00* | (2006.01) |
| *G06T 19/00* | (2011.01) |
| *G06K 9/62* | (2006.01) |
| *G06T 7/73* | (2017.01) |
| *G06T 19/20* | (2011.01) |

(52) U.S. Cl.
CPC ....... *G06K 9/00214* (2013.01); *G06K 9/6215* (2013.01); *G06T 7/75* (2017.01); *G06T 19/006* (2013.01); *G06T 19/20* (2013.01); *G06K 2209/27* (2013.01); *G06T 2207/10016* (2013.01); *G06T 2207/20084* (2013.01); *G06T 2210/12* (2013.01); *G06T 2219/2016* (2013.01)

(58) Field of Classification Search
CPC ........................................... G06T 2207/20084
See application file for complete search history.

(56) References Cited

U.S. PATENT DOCUMENTS

| 9,424,461 | B1* | 8/2016 | Yuan | G06K 9/00201 |
|---|---|---|---|---|
| 2013/0182958 | A1* | 7/2013 | Yoo | G06K 9/00369 |
| | | | | 382/195 |
| 2016/0154994 | A1* | 6/2016 | Kim | G06K 9/00248 |
| | | | | 382/118 |
| 2018/0150701 | A1* | 5/2018 | Kang | G06K 9/78 |
| 2019/0051056 | A1* | 2/2019 | Chiu | G06T 19/006 |
| 2019/0096135 | A1* | 3/2019 | Dal Mutto | G06T 17/20 |

(Continued)

OTHER PUBLICATIONS

International Search Report and Written Opinion—PCT/US2018/050516—ISA/EPO—dated Dec. 20, 2018.

(Continued)

*Primary Examiner* — Oneal R Mistry
(74) *Attorney, Agent, or Firm* — Qualcomm Technologies, Inc.

(57) ABSTRACT

Techniques are provided for selecting a three-dimensional model. An input image including an object can be obtained, and a pose of the object in the input image can be determined. One or more candidate three-dimensional models representing one or more objects in the determined pose can be obtained. From the one or more candidate three-dimensional models, a candidate three-dimensional model can be determined to represent the object in the input image.

30 Claims, 17 Drawing Sheets

(56) References Cited

U.S. PATENT DOCUMENTS

2019/0188541 A1* 6/2019 Wang .................. G01C 3/08

OTHER PUBLICATIONS

Oberweger M., et al., "DeepPrior++: Improving Fast and Accurate 3D Hand Pose Estimation", 2017 IEEE International Conference on Computer Vision Workshops (ICCVW), IEEE, Oct. 22, 2017, XP033303501, DOI:10.1109/ICCVW.2017.75, [retrieved on Jan. 19, 2018] abstract; figures 1-3.8, 10 pages.

Rad M., et al., "BB8: A Scalable, Accurate, Robust to Partial Occlusion Method for Predicting the 3D Poses of Challenging Objects without Using Depth", XP055444095, Mar. 31, 2017 (Mar. 31, 2017), pp. 1-9, DOI:10.1109/ICCV.2017.413, abstract; figures 1-7, sections 1.3.4.

Xiang Y., et al., "ObjectNet3D: A Large Scale Database for 3D Object Recognition", Sep. 17, 2016, International Conference on Simulation, Modeling and Programming for Autonomous Robots, SIMPAR 2010;[Lecture Notes in Computer Science; Lect. Notes Computer], Springer, Berlin, Heidelber, pp. 160-176, XP047362385, ISBN: 978-3-642-17318-9 [retrieved on Sep. 17, 2016], sections 1.3-5, abstract; figures 1-5.7.12.

Zhu J., et al., "Learning Pairwise Neural Network Encoder for Depth Image-based 3D Model Retrieval", Multimedia, Jan. 1, 2015, pp. 1227-1230, XP055533375, 2 Penn Plaza, Suite 701, New York, NY 10121-0701, USA, DOI:10.1145/2733373.2806323, ISBN: 978-1-4503-3459-4, sections 1.3.4, abstract; figures 1-3.

* cited by examiner

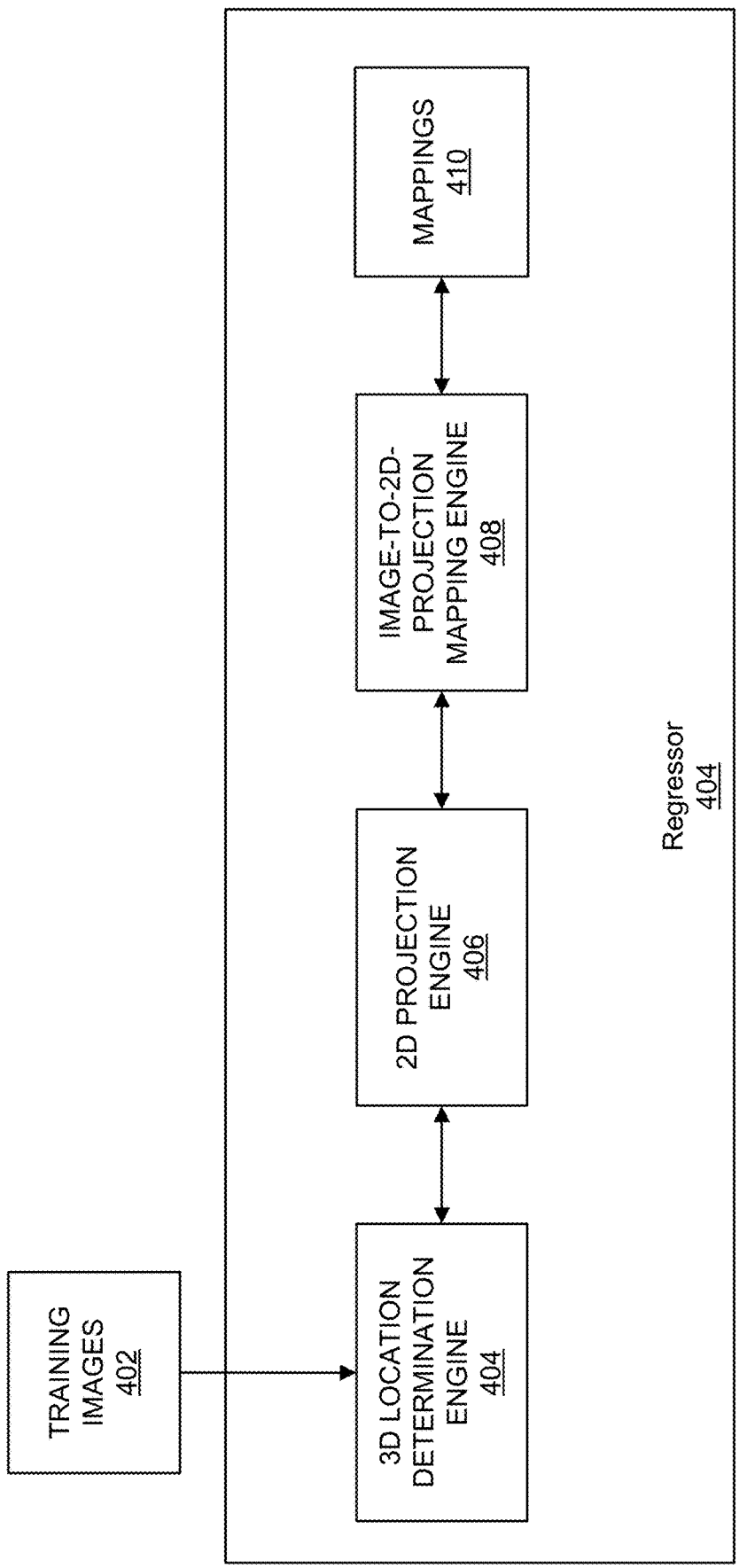

POSE ESTIMATION AND MODEL RETRIEVAL FOR OBJECTS IN IMAGES

CROSS-REFERENCE TO RELATED APPLICATIONS

This application claims the benefit of U.S. Provisional Application No. 62/586,449, filed Nov. 15, 2017, which is hereby incorporated by reference, in its entirety and for all purposes.

FIELD

The present disclosures generally relate to pose estimation and model retrieval for objects in images, and more specifically to estimating poses of objects depicted in images and determining three-dimensional models for representing the objects.

BACKGROUND

Determining objects that are present in real images and attributes of those objects is useful for many applications. For instance, a model can be determined for representing an object in an image, and can be used to facilitate effective operation of various systems. Examples of such applications and systems include augmented reality (AR), robotics, automotive and aviation, three-dimensional scene understanding, object grasping, object tracking, in addition to many other applications and systems.

In AR environments, for example, a user may view images that include an integration of artificial or virtual graphics with the user's natural surroundings. AR applications allow real images to be processed to add virtual objects to the images and to align the virtual objects to the image in multiple dimensions. For instance, a real-world object that exists in reality can be represented using a model that resembles or is an exact match of the real-world object. For example, a model of a virtual airplane representing a real airplane sitting on a runway may be presented in the view of an AR device (e.g., glasses, goggles, or other device) while the user continues to view his or her natural surroundings in the AR environment. The viewer may be able to manipulate the model while viewing the real-world scene. In another example, an actual object sitting on a table may be identified and rendered with a model that has a different color or different physical attributes in the AR environment. In some cases, artificial virtual objects that do not exist in reality or computer-generated copies of actual objects or structures of the user's natural surroundings can also be added to the AR environment.

BRIEF SUMMARY

In some embodiments, techniques and systems are described for estimating poses of objects detected in images and determining three-dimensional models for representing the objects. For example, the techniques and systems described herein can detect one or more target objects in an input image. For each of the target objects detected in the image, a plurality of 3D models can be obtained and analyzed to determine one or more candidate 3D models for each of the objects. For example, the 3D models can be obtained from a database of pre-defined 3D models having different categories and different geometries. In some examples, the 3D models can include 3D meshes representing objects of various categories. The 3D poses of the one or more target objects can be estimated and used to render images or views of the one or more candidate 3D models determined for the target object. For example, an image can be rendered with a candidate 3D model in the pose estimated for the target object. The rendered images can include, for example, depth maps of the 3D models in the estimated pose.

In some cases, categories of the one or more target objects in the input image can be identified. For example, the category of a target object can be used to select the one or more candidate 3D models for the target object from the plurality of 3D models (e.g., from the pre-defined database). In some cases, the relative sizes of the one or more target objects can be estimated. The estimated size of a target object can be used to render the images or views of the candidate 3D models for the target object. For example, the image (e.g., depth map) of a candidate 3D model can be rendered from the estimated 3D pose of the target object after stretching or compressing the 3D model (e.g., the 3D mesh of the model) according to the estimated size of the target object. Modifying the size of a candidate 3D model in addition to putting the 3D model in the estimated pose provides the 3D model in a form that is close to the target object in the input image.

The rendered images or views of the candidate 3D models can then be compared to the input image. Based on the comparison, the candidate 3D model that provides the best match to the target object in the input image is selected as the 3D model that will be used to represent the target object. Various techniques can be used for comparing the rendered images to the input image. In some examples, descriptors can be determined for the input image and for the rendered images. For example, a descriptor can be computed for a region of the input image corresponding to a target object. In some cases, the descriptor computed for the target object in the input image can include a vector including one or more values representing features of the target object. Descriptors can also be computed for the rendered images of the 3D models (e.g., for the depth maps of the 3D meshes). In some cases, a 3D model descriptor can include a vector including one or more values representing features of a 3D model in the estimated pose. The descriptors can be determined so that the affinity between the input image and a corresponding 3D model can be estimated from a comparison between the descriptors. In some examples, the comparison can be performed using a nearest-neighbor search. In some cases, the comparison can be based on a Euclidean distance between the descriptors. Other suitable comparison techniques and types of distances can also be used. The 3D model with a descriptor that has a closest match to the descriptor of the target object is selected as the 3D model for representing the target object. Other techniques can also be used to determine a best-matching 3D model. For instance, a trained classifier can be used to predict if the image of the target object and the rendered image of a 3D model match.

The 3D model selected for representing a target object can be provided for use by any suitable application that can utilize a 3D model (e.g., 3D mesh) for performing one or more operations. In one illustrative example, the selected 3D model can be used by an AR application to represent the object in an AR environment. In other examples, the 3D mesh of the 3D model can be used for 3D scene understanding, object grasping (e.g., in robotics, surgical applications, and/or other suitable applications), object tracking, scene navigation, and/or other suitable applications.

According to at least one example, a method of selecting a three-dimensional model is provided. The method includes obtaining an input image including an object. The method further includes determining a pose of the object in the input image. The method further includes obtaining one or more candidate three-dimensional models representing one or more objects in the determined pose. The method further includes determining, from the one or more candidate three-dimensional models, a candidate three-dimensional model to represent the object in the input image.

In another example, an apparatus for selecting a three-dimensional model is provided. The apparatus includes a processor and a memory configured to store an image including an object. The processor is configured to and can obtain an input image including the object. The processor is further configured to and can determine a pose of the object in the input image. The processor is further configured to and can obtain one or more candidate three-dimensional models representing one or more objects in the determined pose. The processor is further configured to and can determine, from the one or more candidate three-dimensional models, a candidate three-dimensional model to represent the object in the input image.

In another example, a non-transitory computer readable medium having stored thereon instructions that, when executed by one or more processors, cause the one or more processor to: obtain an input image including an object; determine a pose of the object in the input image; obtain one or more candidate three-dimensional models representing one or more objects in the determined pose; and determine, from the one or more candidate three-dimensional models, a candidate three-dimensional model to represent the object in the input image.

In another example, an apparatus for selecting a three-dimensional model is provided. The apparatus includes means for obtaining an input image including an object. The apparatus further includes means for determining a pose of the object in the input image. The apparatus further includes means for obtaining one or more candidate three-dimensional models representing one or more objects in the determined pose. The apparatus further includes means for determining, from the one or more candidate three-dimensional models, a candidate three-dimensional model to represent the object in the input image.

In some examples, the methods, apparatuses, and computer readable medium described above further comprise generating an output image based on the candidate three-dimensional model and the input image.

In some examples, the methods, apparatuses, and computer readable medium described above further comprise: receiving a user input to manipulate the candidate three-dimensional model; and adjusting one or more of a pose or a location of the candidate three-dimensional model in an output image based on the user input.

In some examples, the methods, apparatuses, and computer readable medium described above further comprise: obtaining an additional input image, the additional input image including the object in one or more of a different pose or a different location than a pose or location of the object in the input image; and adjusting one or more of a pose or a location of the candidate three-dimensional model in an output image based on a difference between the pose or location of the object in the additional input image and the pose or location of the object in the input image.

In some examples, obtaining the one or more three-dimensional models representing the one or more objects includes: obtaining a plurality of three-dimensional models representing a plurality of objects; and selecting a subset of the plurality of three-dimensional models as the one or more candidate three-dimensional models.

In some examples, the methods, apparatuses, and computer readable medium described above further comprise: determining a category of the object in the input image; and determining one or more categories associated with the plurality of candidate three-dimensional models. In such examples, the one or more candidate three-dimensional models are selected from the plurality of candidate three-dimensional models based on the one or more candidate three-dimensional models having the category of the object in the input image.

In some examples, the methods, apparatuses, and computer readable medium described above further comprise: generating one or more images for the one or more candidate three-dimensional models, wherein the one or more images are generated to include the one or more objects in the determined pose; generating a descriptor for the object in the input image; and generating one or more descriptors for the one or more images generated for the one or more candidate three-dimensional models, wherein the candidate three-dimensional model is determined based on the descriptor generated for the object and the one or more descriptors generated for the one or more images.

In some examples, the methods, apparatuses, and computer readable medium described above further comprise: comparing the one or more descriptors generated for the one or more images to the descriptor generated for the input image; and determining a descriptor from the one or more descriptors generated for the one or more images that has a closest match to the descriptor generated for the input image, wherein the candidate three-dimensional model is determined based on the descriptor from the one or more descriptors having the closest match to the descriptor generated for the input image.

In some examples, comparing the one or more descriptors generated for the one or more images to the descriptor generated for the input image includes: performing a nearest-neighbor search using the descriptor generated for the input image as input. In some examples, the one or more images generated for the one or more candidate three-dimensional models include one or more depth maps.

In some examples, the one or more candidate three-dimensional models include one or more three-dimensional meshes representing the one or more objects.

In some examples, determining the pose of the object in the input image includes: determining a plurality of two-dimensional projections of a three-dimensional bounding box of the object in the input image; and estimating the pose of the object using the plurality of two-dimensional projections of the three-dimensional bounding box. In some cases, the plurality of two-dimensional projections of the three-dimensional bounding box are determined by applying a trained convolutional network to the image. The trained convolutional network is trained to predict two-dimensional projections of the three-dimensional bounding box of the object in a plurality of poses. In some examples, estimating the pose of the object using the plurality of two-dimensional projections of the three-dimensional bounding box includes applying a perspective-n-point (PnP) problem using correspondences between the predicted two-dimensional projections and three-dimensional points of the three-dimensional bounding box that correspond to the predicted two-dimensional projections. In some examples, the methods, apparatuses, and computer readable medium described above further comprise: determining the three-dimensional points of the three-dimensional bounding box by predicting one or more spatial dimensions of the three-dimensional bounding box and using the one or more spatial dimensions to scale a unit cube.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures:

FIG. 4 is a block diagram illustrating an example of a regressor, in accordance with some examples.

DETAILED DESCRIPTION

Figure 1:
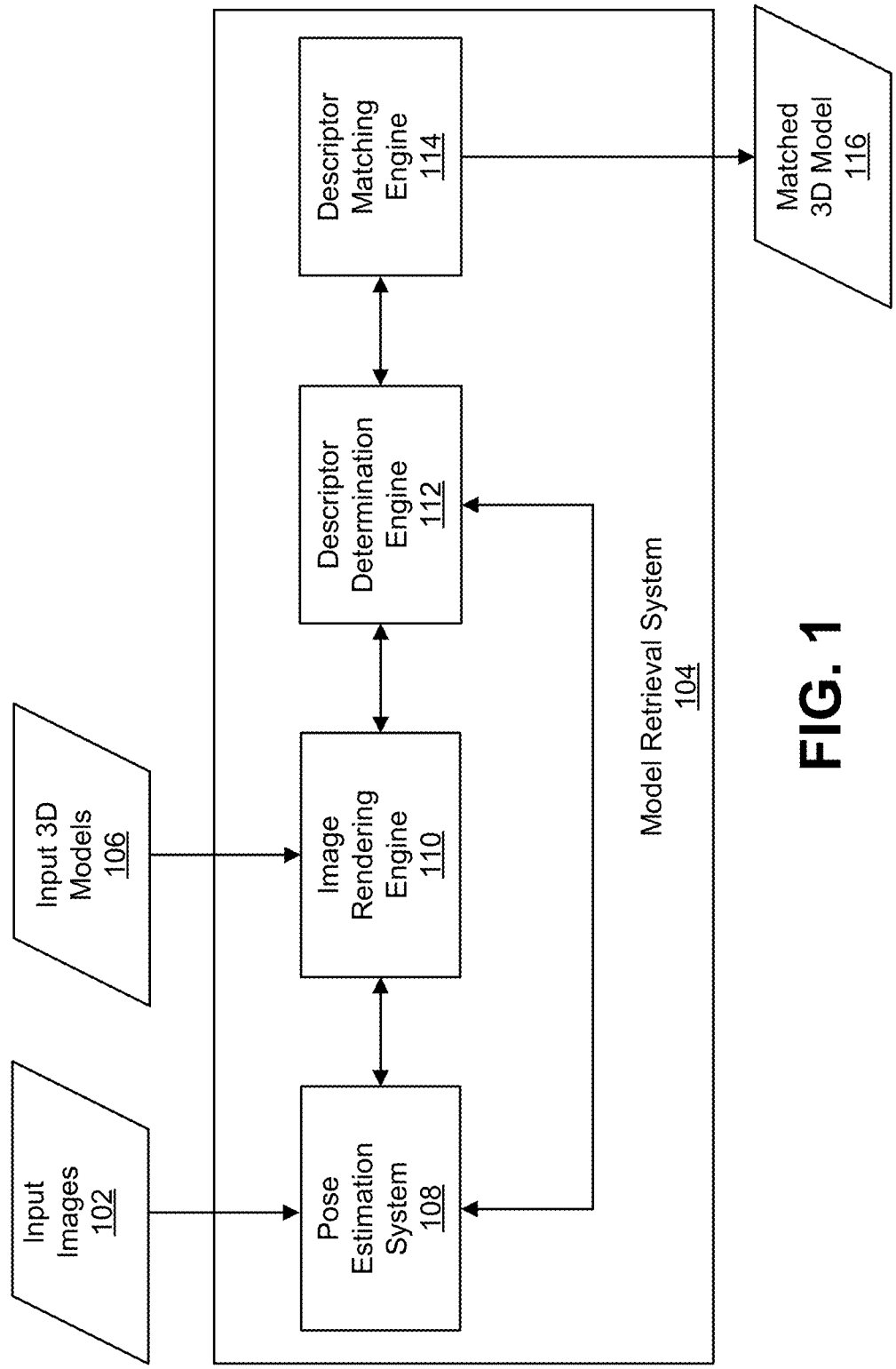
FIG. 1 is a block diagram illustrating an example of a model retrieval system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Retrieving the three-dimensional (3D) shapes of objects from images can be useful for many applications, such as augmented reality (AR) applications, 3D scene understanding, object grasping, object tracking, among others. Various techniques have been proposed for retrieving the 3D shapes of objects. For example, one possible approach is to use stereo reconstruction. However, stereo reconstruction requires several registered images, and only provides an unstructured set of 3D points. A neural network-based approach could also be used. For example, due to the development of Deep Learning, it is now possible to use strong image priors to retrieve 3D geometry from single images. For example, some deep learning based techniques can retrieve a depth map from a single image. However, depth maps resulting from such a technique are still unstructured, and can only provide the visible object geometry. Another approach is to represent the object geometry with voxels. A system can learn to infer a volumetric representation in the form of voxels from objects in images. However, such an approach is unable to predict 3D models with texture and/or material, and is limited to providing a low-resolution 3D geometry of the objects.

Methods and systems described herein leverage 3D models to represent objects detected in input images. For example, a scalable, efficient, and accurate approach is provided to retrieve 3D meshes (representing 3D models) for objects detected in images. The methods and systems described herein also provide techniques for improving the accuracy of a predicted 3D pose of an object in an image, which allows the methods and systems to outperform the state-of-the-art pose determination and modeling techniques. Estimating an accurate 3D pose is important for retrieving 3D meshes for the objects in the images. As described in more detail below, a 3D mesh adapted to the object can be retrieved from a database by matching a descriptor computed for the input image with descriptors computed for the 3D meshes in the database. In some cases, the systems and methods can learn descriptors for rendered images of the 3D meshes. For example, the rendered images of the 3D meshes can include depth renderings. Using depth renderings can alleviate the difference of textures that exists between the meshes and the target object, and can even alleviate the absence of textures for the 3D meshes.

A database of pre-defined 3D models of different categories and geometries can be used to determine candidate 3D models for the detected objects. One illustrative example of such a database is the ShapeNet dataset. Another illustrative example of a pre-defined database of 3D models (represented by 3D meshes) is Pascal3D. One of ordinary skill will appreciate that any suitable set of pre-defined 3D models can be used. The ShapeNet dataset provides a very large panel of categories of objects having different geometries. For example, the 3D models from ShapeNet represent objects of different categories, such as airplanes, cars, chairs, tables, buildings, among many others. Each category includes 3D models having different geometries and colors. For example, the car category includes 3D models of cars having different shapes, sizes, and colors. Examples of the dataset of 3D models provided by ShapeNet can be found at www.shapenet.org.

The 3D models can be used to retrieve a 3D model that approximates the 3D geometry of a target object detected in an input image. A 3D model can be defined by a 3D mesh. As used herein, the terms "3D model" and "3D mesh" can be used interchangeably. An example of a 3D mesh can include a triangle mesh or polygon mesh that includes a collection of vertices, edges, and faces defining the shape of a polyhedral object. There are numerous advantages to recovering a 3D mesh for a 2D object (in an input image) over previous types of 3D representations, such as depth maps or voxels. For example, 3D meshes are structured, lightweight, and are easy to manipulate by other application algorithms (e.g., AR applications, algorithms for grasping, algorithms for tracking, among others). In addition, 3D meshes provide accurate representations of the objects' geometries, and also provide plausible predictions for the parts of an object that are not visible in the input image.

Figure 11A:
FIG. 11A is an example of an input image including objects with certain poses, in accordance with some examples.
Figure 11B:
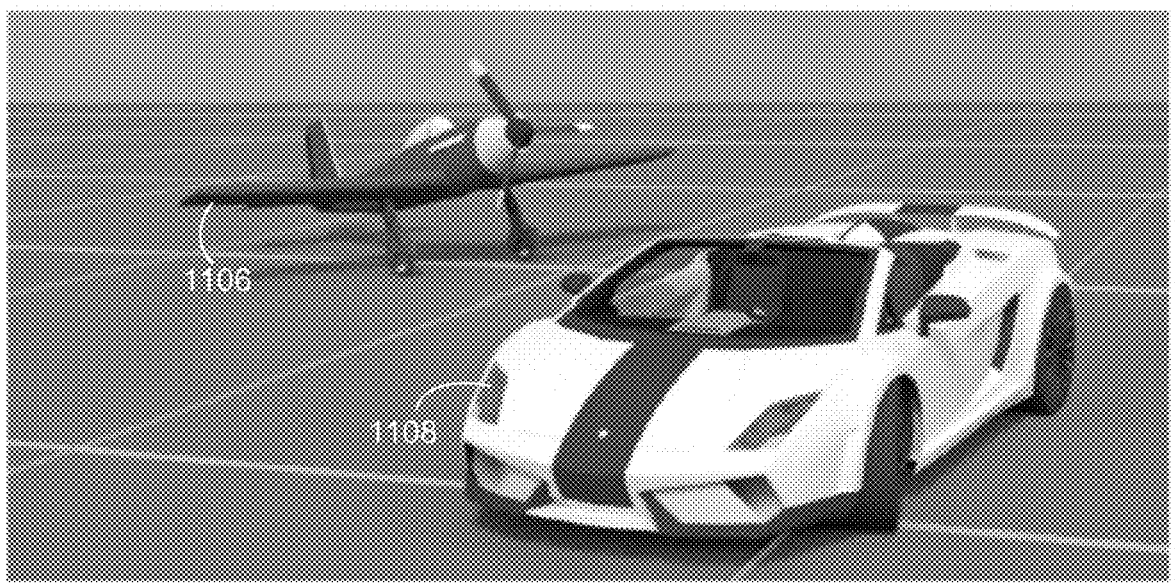
FIG. 11B is an example of a rendered image with 3D models of the objects in the poses shown in FIG. 11A, in accordance with some examples.

It is challenging to identify 3D meshes that fit well with objects for a single color image. The methods and systems described herein provide ways to improve the performance of such a problem. With the improvements described herein, accurate 3D poses can be determined for objects captured in images in the real-world (or "in the wild"), and based on such accurate poses, 3D meshes can be identified from a pre-defined database (e.g., Pascal3D, ShapeNet, or the like) that fit very well with objects, as shown in FIG. 11A and FIG. 11B. For example, FIG. 11A shows an image 1100A with an airplane object 1102 and a car object 1104. Using the techniques described herein, the 3D poses of the airplane object 1102 and the car object 1104 are determined, and corresponding 3D models (3D meshes) of the airplane object 1102 and the car object 1104 are determined. FIG. 11B shows a rendering 1100B with a rendered 3D airplane model 1106 representing the airplane object 1102, and a rendered 3D car model 1108 representing the car object 1104. As shown, the rendered 3D airplane model 1106 and the rendered 3D car model 1108 are in the same poses and have similar features (e.g., geometrically and texture-wise) as the airplane object 1102 and the car object 1104, respectively, in the image 1100A.

As noted above, identifying a 3D mesh that corresponds well to a target object in an input image is challenging. For example, 3D meshes from a pre-defined database (e.g., ShapeNet or other database of 3D models) can have some texture information, but the texture may not correspond with the appearance of the object in general, which can make the affinity between an object's image and the 3D meshes challenging to evaluate. Images of objects in the wild are also affected by uncontrolled lighting, which is difficult to estimate precisely. Further, the 3D meshes do not necessarily align exactly with the objects.

As described in more detail below, one or more input images can be obtained and analyzed to detect one or more target objects in the one or more input images. The 3D pose and size of a target object in an input image can be estimated. After estimating the object's 3D pose and size, a 3D model (e.g., represented using a 3D mesh) can be selected for representing the object. The 3D model can be selected from a database of pre-defined 3D models, such as ShapeNet, Pascal3D, and/or other suitable database of 3D models representing various types of objects. As described above, the textures of the meshes may not correspond to the target objects in general, making the affinity between the object's image and the meshes difficult to evaluate. Descriptors can be learned for the input images and also for rendered images (e.g., depth renderings) of the 3D meshes, so that such affinity can be estimated from a comparison between the descriptors. The descriptors can be computed from depth renderings of the 3D meshes instead of RGB renderings of the 3D meshes or RGB renderings of voxel-based reconstructions. For example, it is difficult and can be impossible to perform a rendering resembling the input image (based on RGB renderings of 3D meshes or RGB renderings of voxel-based reconstructions), as the texture information is mostly irrelevant and lighting is difficult to recover, and voxel-based reconstructions are limited to low-resolution models. Depth renderings are not affected by the irrelevant textures of the meshes, and are still correlated with the appearance of the object, as lighting depends on the object's shape. The comparison between the descriptors of the input image and the descriptors of the rendered images can be based on a distance measurement (e.g., a Euclidean distance, Manhattan distance, or other suitable distance metric). Using a distance-based evaluation can turn the problem into a nearest neighbor search, which is scalable to the size of the database of pre-defined 3D models.

Figure 2A:
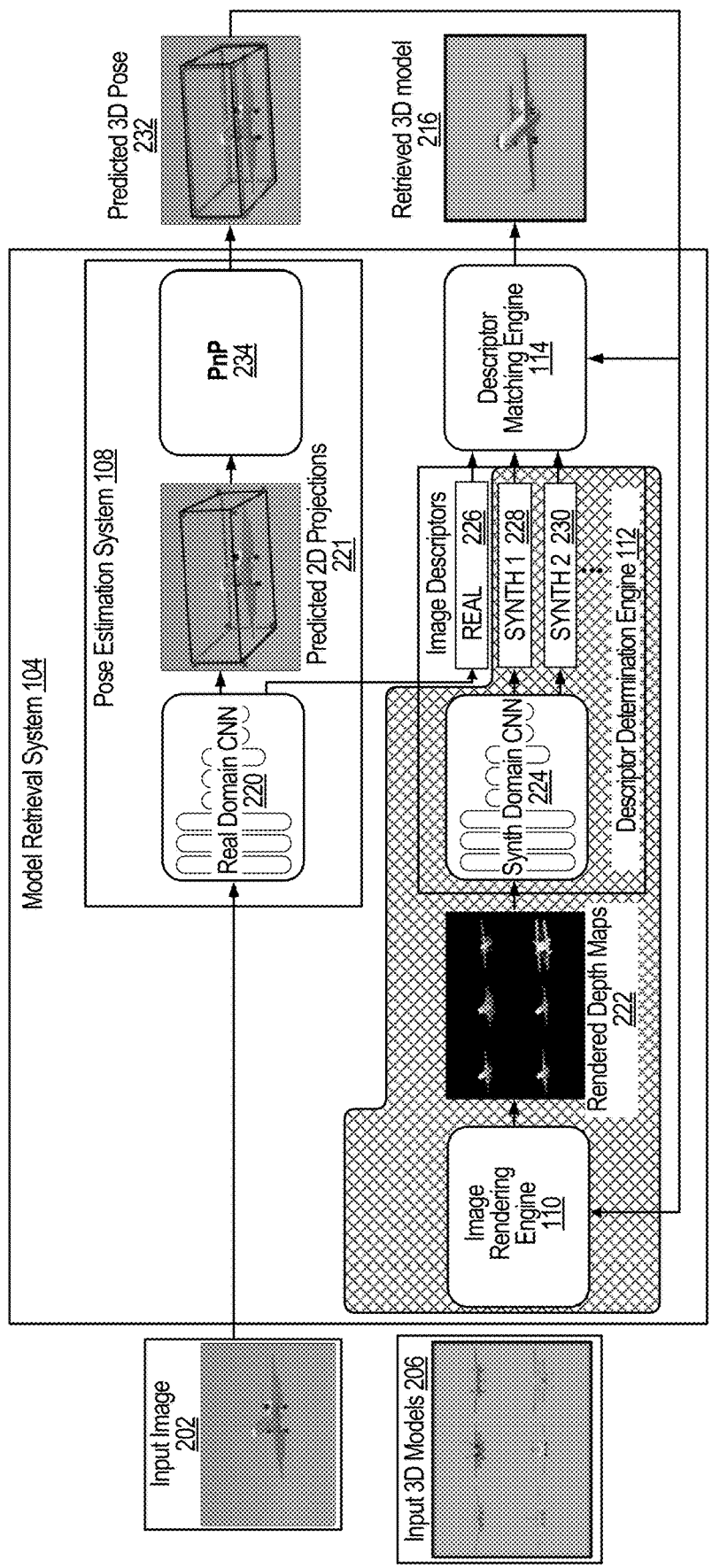
FIG. 2A is a block diagram illustrating another example of the model retrieval system, in accordance with some examples.

FIG. 1 is a block diagram illustrating an example of a model retrieval system 104. FIG. 2A is another block diagram illustrating an example of detailed components of the model retrieval system 104 along with visual representations of an input image 202 with an airplane object, input 3D models 206, rendered depth maps 222 of candidate 3D models for the airplane object, and a retrieved (or matched) 3D model 216 for the airplane object. Details of the detailed components of the model retrieval system 104 shown in FIG. 2A are described further below. The model retrieval system 104 can obtain the input images 102 from an image source (not shown). The model retrieval system 104 can process the obtained input images 102 to determine matched 3D models 116 for representing objects detected in the input images 102. The input images 102 can include color images, such as red-green-blue (RGB) images, images having luma and chroma color components (e.g., YCbCr, YUV, or the like), or images in any other suitable color format. The input images 102 can be stand-alone images or can be part of a video including a sequence of images. The video source can include an image capture device (e.g., a camera, a camera phone, a video camera, a tablet device with a built-in camera, or other suitable image capture device), an image storage device, an image archive containing stored images, an image server or content provider providing image data, a media feed interface receiving images or video from a server or content provider, a computer graphics system for generating computer graphics image data, a combination of such sources, or other source of image content.

In some examples, the model retrieval system 104 and the image source can be part of the same computing device. For example, the computing device can include an electronic device, such as a camera (e.g., a digital camera, a camera phone, a video phone, a tablet device with a built-in camera or other suitable capture device), a mobile or stationary telephone handset (e.g., smartphone, cellular telephone, or the like), a desktop computer, a laptop or notebook computer, a tablet computer, a set-top box, a television, a display device, a digital media player, a video gaming console, a video streaming device, a head-mounted display (HMD) or virtual reality headset, or any other suitable electronic device. In some cases, the computing device (or devices) can include one or more wireless transceivers for wireless communications. In some examples, the model retrieval system 104 and the image source can be part of separate computing devices.

The pose estimation system 108 can process each of the input images 102 to detect one or more target objects in the input images 102. The input image 202 shown in FIG. 2A is an example of an image with an airplane object. FIG. 3A illustrates another example of an input image with an airplane object 302. Any suitable object detector can be used by the pose estimation system 108 to detect the one or more objects in an input image. Examples of object detectors include deep learning-based object detectors, detectors using feature-based object detection, detectors using Viola-Jones object detection, detectors using SVM classification with histograms of oriented gradients (HOG) features, detectors using template-matching based object detection, among others. In some examples, an object can be detected by extracting features of the object from the image, and using a learning algorithm to recognize an object category based on the extracted features. In some implementations, the pose estimation system 108 can perform object localization to detect one or more target objects in an input image, which is described in more detail below with respect to FIG. 2A-FIG. 10.

The pose estimation system 108 can also estimate the 3D poses of the one or more target objects detected in the input images 102. FIG. 3B shows an example of an input image with the airplane object 302 and a bounding box 304 generated for the airplane object 302. Two-dimensional (2D) projections of the eight corners of the bounding box 304 are shown with dots on each corner, including 2D projection 306 and 2D projection 308 as two examples. Any suitable pose estimation technique can be used to determine a 3D pose of an object in an image. For example, given an input image (image 300, which can be an RGB image or image having another color format) of the airplane object, a 3D pose can be computed from the estimated 2D projections of the eight 3D bounding box corners (including 2D projections 306 and 308). Illustrative examples of pose estimation techniques are described below with respect to FIG. 2A-FIG. 10. As shown in FIG. 3C and described below, a number of depth maps of candidate 3D models are then rendered under the estimated pose. The best 3D model is then selected based on a comparison between the airplane object and the depth maps of the candidate 3D models.

The model retrieval system 104 can obtain the input three-dimensional (3D) models 106 from a database (not shown) or other source. As described above, the input 3D models 106 can be obtained from a database of pre-defined 3D models having different categories and different geometries. The 3D models include 3D meshes that define the geometry of the object being represented by the 3D model. For example, a 3D model of an airplane can be defined by a triangle mesh or a polygon mesh that includes a collection of vertices, edges, and faces defining the shape of the airplane. An example of input 3D models 206 of six different airplanes is shown in FIG. 2A. One illustrative example of such a database of 3D models is the ShapeNet dataset. However, one of ordinary skill will appreciate that any suitable set of pre-defined 3D shapes or models that are defined using 3D meshes can be used.

For each of the target objects detected in an input image, the input 3D models 106 are analyzed by the image rendering engine 110 to determine one or more candidate 3D models for each of the target objects. The one or more candidate 3D models for a particular target object can be determined from the input 3D models 106 based on a category determined for the target object. For example, the airplane object 302 shown in FIG. 3A can be identified as an "airplane" category. The category of the target object can then be used to select the one or more candidate 3D models for the target object from the input 3D models 106. For example, as shown in FIG. 3C, six candidate 3D models of airplane objects (shown as depth maps) are selected for the airplane object 302.

The image rendering engine 110 can use the 3D poses (determined by the pose estimation system 108) of the one or more target objects in an input image to render images of the one or more candidate 3D models determined for the target object. For example, the image rendering engine 110 can render an image of the 3D mesh of a candidate 3D model in the pose estimated for the target object. In various implementations, the rendered images can include depth maps, binary masks, color images, or other suitable renderings. Implementations described herein use depth maps as examples of the rendered images. However, one of ordinary skill will appreciate that other types of rendered images can be used, such as binary masks, color images, or other suitable renderings.

As noted above, the rendered images generated by the image rendering engine 110 can include depth maps of the 3D meshes (of the 3D models) in the estimated pose. The image rendering engine 110 can be configured to render depth maps of the 3D meshes due to the difficulty of generating a realistic rendering resembling the input image, as the texture information of the object is mostly irrelevant (e.g., the texture may not correspond to the appearance of the object) and lighting is difficult to recover, and also because a depth map captures the geometry of the 3D mesh. For example, the image rendering engine 110 can render a depth map for each of the candidate 3D models in the pose determined for the target object. FIG. 3C shows examples of depth maps generated for six different candidate 3D airplane models, each depth map being generated with the corresponding 3D model in the pose determined for the airplane object 302.

In some cases, the image rendering engine 110 can estimate the sizes of the one or more target objects detected in an input image. The estimated size of a target object can be used when rendering the depth maps of the candidate 3D models of the target object. In one illustrative example, the relative size of an object can be determined in three directions, including length, width, and height. The size of a target object can be estimated using any suitable technique. For example, as described below with respect to FIG. 2A and FIG. 2B, 3D dimensions of the target object can be predicted during pose estimation (represented below as spatial dimensions $D=[d_x, d_y, d_z]$ of the object's 3D bounding box).

The estimated size of a target object can be used by the image rendering engine 110 to render the depth maps of the candidate 3D models determined for the target object. For instance, the 3D meshes of the six candidate 3D models shown in FIG. 3C can be stretched or compressed to match the estimated size of the airplane object 302. In one example, as described below with respect to FIG. 2A and FIG. 2B, the vertices of the 3D meshes can be multiplied by a minimum of the ratio between the predicted 3D dimensions computed during pose estimation and the model's actual 3D dimensions. The depth maps generated for the six size-adjusted candidate 3D models can then be rendered from the estimated 3D pose of the airplane object 310. Modifying the size of the candidate 3D models in addition to rendering depth maps of the 3D models in the estimated pose of the target object provides the depth maps in a form that is similar to the form with which the target object is displayed in the input image. Such size and pose alignment can aid in the image comparison described below.

The rendered depth maps of the candidate 3D models for a target object can then be compared to the input image. For example, characteristics of depth maps generated for the 3D meshes (of the candidate 3D models) can be compared to the region of the input image that contains the target object. The descriptor determination engine 112 can determine descriptors for the region in the input image corresponding to the target object and also for the rendered depth maps. For example, the input image can be cropped to obtain a region surrounding the target object. The region for cropping can be determined by placing a bounding region (e.g., a bounding box, a bounding rectangle, a bounding ellipse, or other suitably-shaped bounding region) around the target object. The portion of the image contained in the bounding region can then be cropped. In some cases, the portion of the image can include the image window W (also referred to as an image patch) described below with respect to FIG. 2A-FIG. 10. In some cases, the input image windows can be known. In some cases, the input image windows can be determined by a 2D object detector. An example of such an object window determination is described in S. Ren, K. He, R. Girshick, and J. Sun. "Faster R-CNN: Towards Real-Time Object Detection with Region Proposal Networks," In Advances in Neural Information Processing Systems, pages 91-99, 2015, which is hereby incorporated by reference in its entirety and for all purposes.

The descriptor determination engine 112 can compute a descriptor for the cropped region of the input image, in which case the descriptor corresponds to the target object that is in the cropped region. The descriptor for the target object can include an N-dimensional vector including one or more values representing features of the target object, with each dimension of the vector including a particular value. For example, a 2-dimensional vector can be computed for the cropped region of the input image.

The descriptor determination engine 112 can also compute a descriptor for each of the rendered depth maps of the candidate 3D models determined for a target object. For example, a descriptor computed for a depth map of one of the candidate 3D models can include an N-dimensional vector including one or more values representing features of the depth map with the estimated pose. The dimension (N) of the descriptor vectors determined for the depth maps of the candidate 3D models matches the dimension (N) of the descriptor determined for the target object. For example, a 2-dimensional vector can be computed for a depth map of a candidate 3D model. Examples of generating descriptors for an input image and for 3D meshes of 3D models are described below with respect to FIG. 2A and FIG. 2B. In some cases, the descriptor determination engine 112 can pre-compute the descriptors for the 3D meshes (of the 3D models) seen under various poses. As described below, at run-time, identifying a matching 3D mesh can then be done by performing an optimization problem (e.g., a nearest-neighbor search) using the descriptor for the input image as query.

The descriptors can be used by the descriptor matching engine 114 to determine an affinity between the region of the input image corresponding to the target object and each of the candidate 3D models. The affinity between the target object and the candidate 3D models can be estimated based on a comparison between the descriptor of the target object and the set of descriptors computed for the depth maps of the candidate 3D models. In some examples, as noted above, the descriptor matching engine 114 can perform the comparison using an optimization problem. One illustrative example of an optimization problem that can be used by the descriptor matching engine 114 is a nearest-neighbor search. As the nearest neighbor search can be done in sub-linear time (at least approximatively), such a comparison technique is scalable according to the number of 3D models in the dataset. The nearest neighbor search can be defined as follows: given a set S of points in a space M and a query point q∈M, find the closest point in S to q. The set of descriptors for the candidate 3D models can make up the set S set of points, and the descriptor computed for the target object can be the query point q. The space M can be a metric space and a dissimilarity between the S points and the query point q can be determined as a distance metric. For example, the space M can be the N-dimensional vector space of the descriptors.

The nearest neighbor search can be performed by the descriptor matching engine 114 to find the descriptor from the set of 3D model descriptors that is a closest match to (or is most similar to) the descriptor computed for the target object. For example, the descriptor matching engine 114 can determine a distance between the descriptor of the target object and each of the descriptors of the candidate 3D models. The distance can include a Euclidean distance, a Manhattan distance, or any other suitable distance metric. Using FIG. 3C as an example, a Euclidean distance can be computed between the N-dimensional vector of the descriptor computed for the airplane object 302 and the N-dimensional vector of each of the descriptors computed for the six depth maps determined for the six candidate airplane 3D models. For instance, using a 2D vector as an example of the descriptors, the 2D vector values of the target object descriptor is compared to the 2D vector values of each the 3D model depth maps. The result of such an example is six Euclidean distances, one for each target object descriptor-candidate 3D model descriptor pair.

Figure 3B:
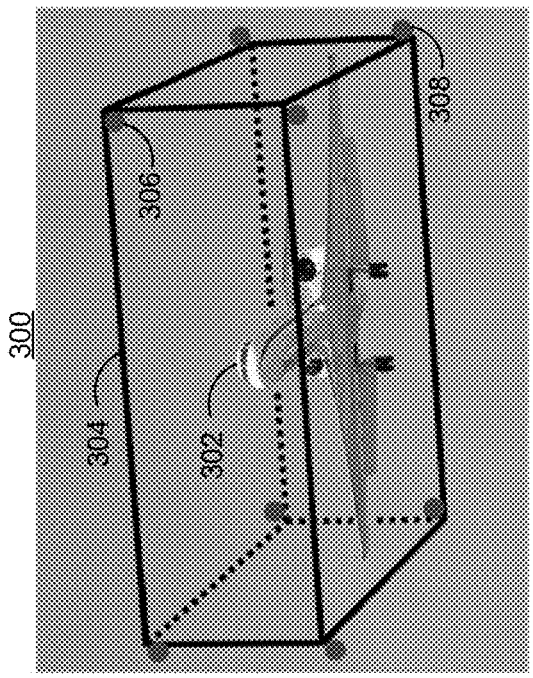
FIG. 3A-FIG. 3D are images illustrating an example of a 3D model retrieved for an object in an input image, in accordance with some examples.
Figure 3D:
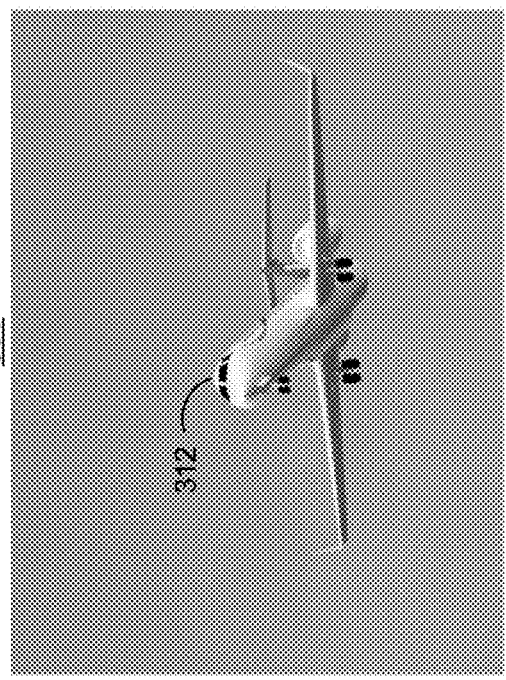

Based on the comparison, the candidate 3D model that provides the best match to the target object in the input image is selected as the 3D model that will be used to represent the target object. For example, the 3D model having the descriptor with the least distance to the descriptor of the target object is determined to be the closest or best match to the target object. Referring to FIG. 3C, the descriptor of the airplane 3D model depth map highlighted by the bounding box 310 is determined to be a closest match to the airplane object 302. As a result, the 3D model corresponding to the best-matched depth map is used as the 3D model for representing to the target object. Referring to FIG. 3D, the 3D airplane model 312 is selected to represent the airplane object 302. As shown, the 3D airplane model 312 is rendered for display and replaces the airplane object 302 in the image 300.

Other suitable comparison techniques can also be used to compare the target object and the candidate 3D models of the target object to determine a best-matching 3D model. For example, in some implementations, a trained classifier (e.g., a convolutional neural network-based classifier, or other suitable object classifier) can be used to predict if the target object (e.g., the cropped region containing the target object) and the depth map of a 3D mesh (representing a 3D model) match. In such an example, the classifier can be trained to perform the prediction based on a number of training images containing similar types of objects and a number of training 3D models that are input to the classifier. In some cases, using a neural network based classifier may require a linear search over the set of available 3D meshes (of the 3D models) for the target object's category, which can prevent such an approach from being scalable. As noted above, the nearest neighbor search can be done in sub-linear time (at least approximatively), allowing it to be scalable according to the number of 3D models in the 3D model dataset.

The 3D mesh selected by the descriptor matching engine 114 for representing a target object can be provided for use by any suitable application that can utilize a 3D mesh for performing one or more operations. For example, the selected 3D model can be used by an AR application to represent the object in an AR environment. For example, referring again to FIG. 3D, the 3D airplane model 312 is selected to represent the airplane object 302, and can replace the airplane object 302 in the image 300. A viewer can then manipulate the location, orientation, geometry, and/or other characteristic of the 3D airplane model 312. In other examples, the 3D mesh of the selected 3D model can be used for 3D scene understanding, object grasping, object tracking, scene navigation, and/or other suitable applications. For example, based on a 2D input image of the scene, a 3D scene modeling application can determine the 3D layout of the scene using the 3D meshes of matched 3D models representing objects in the scene. As another example, an algorithm controlling a robot can determine the geometry and pose of a real-world object that the robot is attempting to grasp based on an input 3D mesh representing the real-world object. The algorithm can then cause the robot to grasp the real-world object based on the estimated geometry and pose defined by the 3D mesh of the matched 3D model.

Figure 2B:
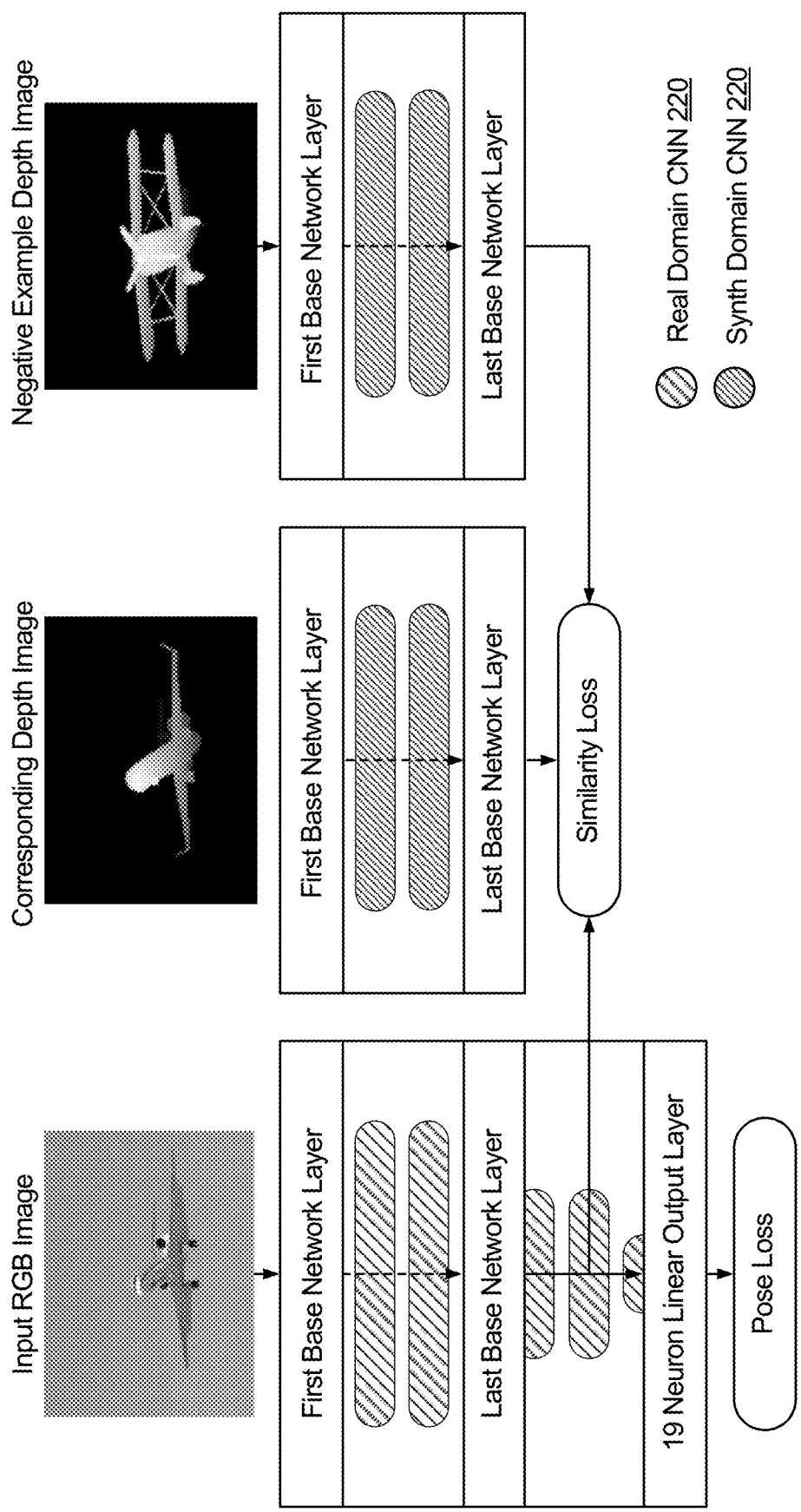
FIG. 2B is a block diagram illustrating an example of a network architecture used by the model retrieval system, in accordance with some examples.
Figure 3A:
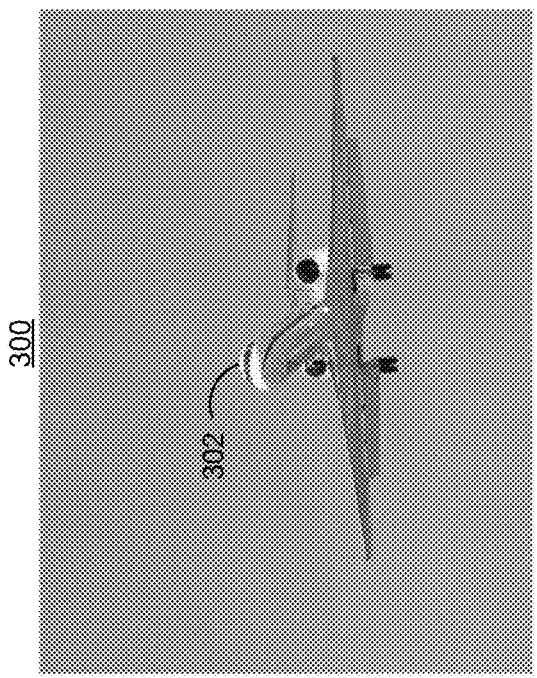
Figure 3C:
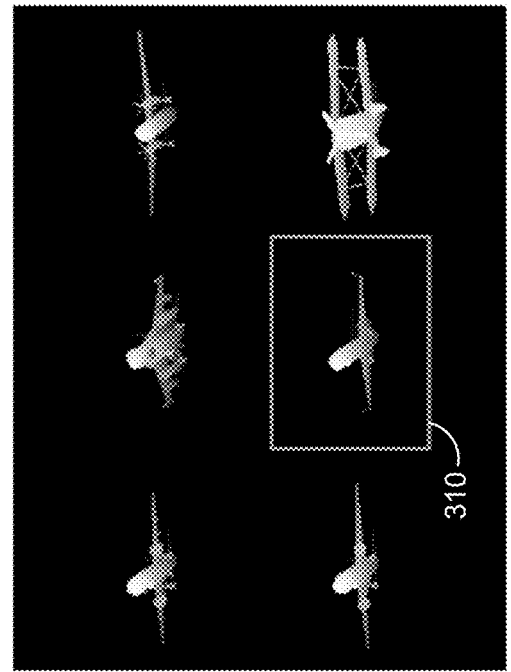

FIG. 2A and FIG. 2B are now described in detail. As noted above, FIG. 2A is a block diagram illustrating an example of the detailed components included in the model retrieval system 104. FIG. 2B is a diagram illustrating an example of architectures of a real domain CNN 220 and a synthetic domain CNN 224 that can be used in the model retrieval system 104. As described above, the model retrieval system can analyze an input image to predict a 3D pose of an object, given an image window roughly centered on the object. 3D pose estimation is the process of determining the orientation (or rotation) and translation of an object in a 2D image or other medium (e.g., in a laser scan or other medium that portrays a 3D object). The pose estimation can produce a 3D pose with six degrees of freedom, including three dimensions for orientation and three dimensions for translation. The model retrieval system 104 can then retrieve a 3D model that corresponds well to the target object in the input image. As described above, the 3D model can be retrieved by matching learned image descriptors of the image window (of the object) against descriptors computed for multiple candidate 3D models rendered under the predicted pose of the object. The candidate 3D model with the best-matched descriptor can be selected as the retrieved 3D model. In some cases, as described above, the category of the target object can be estimated and used to determine candidate 3D models.

In some cases, the category of the target object can be estimated and can be used to assist the 3D pose estimation as well as the 3D model retrieval. Knowing the object category provides useful prior information which eases both tasks. Considering 3D pose estimation, objects within a certain category tend to have similar geometry which can be leveraged to improve the pose prediction. Considering 3D model retrieval, knowing the category reduces the computational workload because it omits rendering and matching 3D models from categories other than the category of the target object. In some cases, the category of the target object can be known. In some cases, the category of the target object can be determined by an image classification method. An example of such an image classification method is described in K. He, X. Zhang, S. Ren and J. Sun "Deep Residual Learning for Image Recognition," in Conference on Computer Vision and Pattern Recognition, pages 770-778, year 2016, which is hereby incorporated by reference in its entirety and for all purposes. In some cases, the category of the target object can also be determined by a 2D object detector. An example of such an 2D object detector is described in S. Ren, K. He, R. Girshick, and J. Sun, "Faster R-CNN: Towards Real-Time Object Detection with Region Proposal Networks", in Advances in Neural Information Processing Systems, pages 91-99, 2015, which is hereby incorporated by reference in its entirety and for all purposes.

Referring to FIG. 2A, given the input image 202 (e.g., an RGB image, YCbCr image, or the like) of an airplane object, the 3D pose of the airplane object can first be determined. A real domain convolutional neural network (CNN) 220 can be used to jointly predict the airplane object's 3D dimensions and the 2D projections of the 3D bounding box corners (the dots on each corner of the bounding box surrounding the airplane). From these 2D predictions, the object pose is recovered using a perspective-n-point (PnP) application 234 or algorithm. Given the input 3D models 206 (e.g., represented by 3D meshes), the image rendering engine 110 can generate depth renderings of the 3D meshes (e.g., by rendering depth maps for the 3D meshes) for the object categories under the estimated pose. The depth renderings are shown as rendered depth maps 222. In some cases, the category can be obtained by retrieval. A synthetic domain CNN 224 can then be used to predict descriptors 228, 230, etc., for each of the rendered depth maps 222 of the input 3D models 206. As shown, the descriptor 226 for the input image 202 can be computed during pose estimation by the real domain CNN 220, and can be extracted from the penultimate layer of the real domain CNN 220 (as shown in FIG. 2B). The computed synthetic image descriptors 228, 230, etc. can then be matched against the real image descriptor 226, after which the closest 3D model is retrieved (shown as retrieved 3D model 216). In some examples, the image rendering engine 110 and the descriptor determination engine 112 can be used to pre-compute the synthetic image descriptors off-line.

Any suitable technique can be used by the pose estimation system 108 to determine the pose of a target object in an image. One illustrative example of a pose estimation technique will now be described. For example, the 3D pose estimation can be performed by predicting the 2D image locations of multiple virtual control points. For example, the real domain CNN 220 (e.g., a deep CNN with multiple hidden layers) can be used to predict the 2D image locations of the projections of the eight 3D bounding box corners of the airplane object (shown as predicted 2D projections 221 in FIG. 2A). The actual 3D pose of the object is then computed by solving a perspective-n-point (PnP) problem, which recovers rotation and translation from 2D-3D correspondences. For example, the 2D-3D correspondences can include a correspondence between a 3D location of a point of the bounding box (e.g., a 3D corner of the bounding box) and the 2D projection in the image of that point on the bounding box. Any suitable PnP technique can be used, including P3P, efficient PnP (EPnP), or other suitable PnP technique. One example of a PnP algorithm that can be used is described in Lepetit, V.; Moreno-Noguer, M; Fua, P. (2009). "*EPnP: An Accurate O(n) Solution to the PnP Problem*". *International Journal of Computer Vision*. 81 (2): 155-166, which is hereby incorporated by reference in its entirety and for all purposes.

In order to use a PnP algorithm, the 3D coordinates of the virtual control points must be known. In some cases, the exact 3D model to be known at runtime can be assumed or the projections of static 3D points can be predicted, which both present some limitations. In some cases, such limitations can be overcome in an effective way by predicting the spatial dimensions $D=[d_x, d_y, d_z]$ of the object's 3D bounding box, and using the spatial dimensions D to scale a unit cube which approximates the ground truth 3D coordinates. For instance, the unit cube can be scaled using the spatial dimensions so that the 3D coordinates of the corners of the unit cube are at similar locations as the object's 3D bounding box. In one illustrative example, a unit cube with a side length of 1 is centered in the 3D coordinate system (e.g., at position=(0,0,0)). The coordinate of the eight unit cube corners are ((0.5,0.5,0.5)/(0.5,0.5,−0.5)/(0.5,−0.5,0.5)/(0.5,−0.5,−0.5)/(−0.5,0.5,0.5)/(−0.5,0.5,−0.5)/(−0.5,−0.5,0.5)/(−0.5,−0.5,−0.5)). Each coordinate can be scaled using the predicted dimensions D=[dx,dy,dz] to get a cuboid centered in the 3D coordinate system that has the following eight corners ((0.5\*dx,0.5\*dy,0.5\*dz)/(0.5\*dx,0.5\*dy,−0.5\*dz)/(0.5\*dx,−0.5\*dy,0.5\*dz)/(0.5\*dx,−0.5\*dy,−0.5\*dz)/(−0.5\*dx,0.5\*dy,0.5)/(−0.5\*dx,0.5\*dy,−0.5\*dz)/(−0.5\*dx,−0.5\*dy,0.5\*dz)/(−0.5\*dx,−0.5\*dy,−0.5\*dz)).

Accordingly, a CNN architecture which jointly predicts the 2D image locations of the projections of the eight 3D bounding box corners (16 values) can be used as well as the 3D bounding box spatial dimensions (3 values). The architecture shown in FIG. 2B supports joint optimization for 3D object pose estimation and 3D model retrieval. The pose loss (e.g., as defined by equation (1) below) is computed on the output of the real domain CNN 220. The similarity loss is computed on hidden feature maps extracted from the last base network layer of the real domain CNN 220 and the synthetic domain CNN 224. As shown in FIG. 2B, the CNN architecture can be implemented as a single 19 neuron linear output layer that is applied on top of the penultimate layer of different base networks, such as VGG or ResNet.

During training, the system 104 can optimize for the following pose loss:

$$L_{pose}=L_{proj}+\alpha L_{dim}+\beta L_{reg}, \qquad \text{Equation (1)}$$

which is a linear combination of losses for the prediction of the projections of the virtual control points, the dimensions (D or $d_i$), and the regularization. The metaparameters $\alpha$ and $\beta$ control the impact of the different loss terms. In some examples, the choice of $\alpha$ and $\beta$ can be insensitive, in cases where there is a strong consensus between the object dimensions within each category. The regularization loss enforces the parameters of the networks (CNN 220 and CNN 224) to have low norm. Such a use of regularization loss can be used to prevent overfitting, which is useful when dealing with a low number of training samples. In some cases, the regularization loss can add L1 weight decay for the CNN parameters to prevent overfitting. In some cases, the regularization loss can be set to 0.0001. The projection loss:

$$L_{proj} = E\left[\sum_{i=0}^{7} \|Proj_{R,t}(M_i) - \tilde{m}_i\|_{Huber}\right] \qquad \text{Equation (2)}$$

minimizes the distances between the projections $\text{Proj}_{R,t}(M_i)$ of the ground truth 3D bounding box corners $M_i$, using the ground truth pose given by rotation R and translation t, and the predicted locations of these projections $\hat{m}_i$ computed by the CNN 220. Huber loss, squared loss, or other suitable loss can be used. The Huber loss is described in P. J. Huber et al., "Robust Estimation of a Location Parameter," The Annals of Mathematical Statistics, 35(1):73-101, 1964, which is hereby incorporated by reference in its entirety and for all purposes. In some cases, the Huber loss is used in favor of the squared loss to be more robust to outliers, because there can be some incorrect annotations in datasets, such as ShapeNet, Pascal3D+, or the like. The dimension loss:

$$L_{dim} = E\left[\sum_{i=x,y,z} \|d_i - \tilde{d}_i\|_{Huber}\right] \quad \text{Equation (3)}$$

minimizes the distance between the ground truth 3D dimensions $d_i$ and the predicted 3D dimensions $\tilde{d}_i$ computed by the CNN 220. Finally, the regularization loss $L_{reg}$ adds L1 weight decay for all CNN parameters to reduce the risk of overfitting.

The above-described approach for determining a 3D pose of an object has a number of advantages compared to other methods that perform pose estimation for objects in the wild. For example, in contrast to methods based on classification, the accuracy of the above-described approach is not limited by the discretization interval of rotation angles, because such an approach regresses the object pose via 2D projections. Furthermore, many approaches perform viewpoint estimation (3-DoF rotation), whereas the above-described approach implicitly computes a 6-DoF pose (rotation and translation). The additional translation information can be used to refine the 2D object localization by re-projecting the 3D bounding box or a retrieved 3D model. This can be beneficial for augmented reality (AR) applications, because the center of the detected 2D image window is oftentimes different from the projection of the object's 3D center.

Pose estimation approaches based on real keypoint estimation rely on category-specific or even instance-specific keypoints, whereas the virtual control points described above generalize across different categories. As a result, the above-described pose estimation can perform category agnostic pose estimation. Moreover, the above-described approach is theoretically capable of estimating the 3D object dimensions and distance to the camera in meters.

The 3D model retrieval techniques described herein can be formulated as a metric learning approach. For example, a number of candidate 3D models can be rendered (e.g., as rendered depth maps 222, such as depth maps) under the predicted pose of the object in an input image. The synthetic domain CNN 224 can then be used to extract an image descriptor for each of the rendered depth maps 222. The image descriptors are referred to herein as synthetic descriptors. A synthetic descriptor can be computed for each of the rendered depth maps. The image descriptors are shown in FIG. 2A as synthetic descriptor 228 and synthetic descriptor 230. In FIG. 2A, only six input 3D models 206, six rendered depth maps 222, and two synthetic descriptors 228 and 230 are shown as illustrative examples due to limited space. However, the number of input 3D models, rendered depth maps, and synthetic descriptors is not limited and can be any suitable number, such as one hundred thousand or larger.

Using the example shown in FIG. 2A, a synthetic descriptor is computed for each of the rendered depth maps 222, in which case six total synthetic descriptors will be generated for the rendered depth maps 222. The six synthetic descriptors can then be matched against an image descriptor computed for the input RGB image (shown in FIG. 2A as real descriptor 226), after which the best model is identified and retrieved. As noted above, such an approach also supports offline pre-computation of descriptors for fast and scalable inference, as discussed in more detail below.

In some cases, metric learning approaches to 3D model retrieval in the wild can render RGB images (or images having other color spaces) from 3D models. This allows such approaches to train a single CNN for image descriptor extraction from real and synthetic images, while purely training on synthetic images. However, there can be a significant gap between the real and synthetic image domain, which is hard to account for in a single shared CNN architecture. Such an issue is addressed herein by training an individual CNN for each domain, including the real domain CNN 220 and the synthetic domain CNN 224. In this way, the model retrieval system 104 can learn to bridge the domain gap between synthetic and real images by the highly non-linear transformations of a deep CNN. This multi-view learning setup allows the model retrieval system 104 to map different representations of an object to a common feature space without the limitations of a shared CNN architecture.

The model retrieval system 104 can leverage the potential of the multi-view metric learning approach by rendering depth images instead of RGB images. As a result, the model retrieval system 104 can use 3D models without texture or material, and can additionally circumvent the problem of how to set up the lighting for the 3D models. The depth images can be rendered using any suitable rendering technique. In one illustrative example, the image rendering engine 110 can use a dedicated software tool (e.g., Blender3D, or other suitable software) to render depth images from the 3D meshes. In other illustrative examples, the image rendering engine 110 can use a hardware accelerated rendering application programming interface (API) (e.g., OpenGL, Vulcan, DirectX, or the like), or a software rendering implementation. In some implementations, binary object masks could be rendered instead of depth maps. In some cases, binary object masks contain less information than depth images.

Before rendering a 3D model to produce rendered depth maps (or binary object masks), the 3D model can be rescaled to tightly fit into the predicted 3D bounding box described above. This can be done, for example, by multiplying all vertices with the minimum of the ratio between the predicted 3D dimensions computed during pose estimation and the model's actual 3D dimensions. In this way, the alignment of the object views between the real and the synthetic domain can be improved.

Correspondences between 3D models and RGB images can be used for training the CNN 220 and/or the CNN 224. Such correspondences are available in datasets like Pascal3D+, which is described in Y. Xiang, R. Mottaghi, and S. Savarese, "Beyond Pascal: A Benchmark for 3D Object Detection in the Wild," In Proceedings of the IEEE Winter Conference on Applications of Computer Vision, pages 75-82, 2014, which is hereby incorporated by reference in its entirety and for all purposes.

The image descriptors can then be extracted from the two different domains by the descriptor determination engine 112 and the pose estimation system 108. For the real world query image (input image 202), an image descriptor (e.g., descriptor 226) is extracted from the hidden features activations of the penultimate layer of the pose estimation real domain CNN 220 (as shown in FIG. 2B). For example, the hidden features activations of the penultimate layer of the real domain CNN 220 are the output computed by the penultimate layer. The output can be used as an image descriptor. In some cases, the descriptor (output from the penultimate layer) can be a feature vector of a certain dimensionality (e.g., a dimensionality of 2048). In some cases, the descriptor contains a compact representation of the input which was learned by the real domain CNN 220. An advantage of such an approach is that these activations are already computed during pose estimation inference, which means the model retrieval system 104 can get a real image descriptor without any additional computational cost.

For the synthetic depth renderings (e.g., rendered depth maps 222), an image descriptor can be extracted from the synthetic domain CNN 224. For example, the synthetic domain CNN 224 can learn to compute a synthetic descriptor from a depth image. The depth image synthetic descriptor can be a feature vector computed by the synthetic domain CNN 224, and can have a certain dimensionality (e.g., a dimensionality of 2048). The depth image synthetic descriptor can be similar to an image descriptor computed by the real domain CNN for an input image. For example, both the real and synthetic descriptors can have the same dimensionality (e.g., a dimensionality of 2048) and, as described above and below, the descriptor matching engine 114 can use the Euclidean distance to compare the real and synthetic descriptors.

The synthetic domain CNN 224 can have the same architecture as the pose estimation real domain CNN 220, but with a different output layer, as shown in FIG. 2B. In order to use such a CNN architecture with depth images, the model retrieval system 104 can replicate them from one to three channels. During training, the model retrieval system 104 can optimize for the similarity loss:

$$L_{similarity} = L_{desc} + \gamma L_{reg_2},\qquad\text{Equation (4)}$$

which comprises the image descriptor and regularization losses weighted by the metaparameter $\gamma$. The similarity loss can then be used to select the retrieved 3D model for use in representing a target object. For example, the candidate 3D model (represented by a 3D mesh) that has the lease similarity loss, with respect to a target object's descriptor, can be selected as the 3D model that will be retrieved for the target object.

The image descriptor loss, denoted as:

$$L_{desc} = \max(0, s^+ - s^- + m),\qquad\text{Equation (5)}$$

minimizes the Triplet loss evaluated on the Euclidean similarity between the real image descriptor and the corresponding synthetic image descriptor $s^+$, and the Euclidean similarity between the real image descriptor and negative example synthetic descriptor $s^-$ respectively. Triplet loss is described in K. Weinberger and L. Saul, "Distance Metric Learning for Large Margin Nearest Neighbor Classification," Journal of Machine Learning Research, 10(February):207-244, 2009, which is hereby incorporated by reference in its entirety and for all purposes. The margin m specifies the desired minimum difference between $s^+$ and $s^-$. The regularization loss $L_{reg_2}$ adds L1 weight decay for all CNN parameters, similar to the pose estimation loss in Equation 1.

As shown in FIG. 2B, it is possible to jointly train the real and synthetic domain CNNs 220 and 224 by combining the two loss functions (Equations (1) and (4) above).

As noted above, an advantageous property of the above-described approach is that it supports pre-computed synthetic descriptors. By pre-computing synthetic descriptors, the model retrieval system 104 can render a very large number of 3D models, so that for each model the model retrieval system 104 can generate depth images which cover the full pose space. Descriptors can then be computed for all of the renderings. In some cases, the descriptors can be stored in a database. At run-time or test-time, the model retrieval system 104 can match descriptors from the closest viewpoint, which is fast and scalable.

Any suitable network architectures for the CNN 220 and CNN 224 networks can be used. In some cases, object detections have a small 2D bounding box, and the object image has a low-resolution. As described above, these detections can be upscaled to fit the fixed spatial input resolutions of pre-trained CNNs (224×224). Upscaling can result in blurry images with washed out details, oversmoothed edges, and burred corners, for example when a detected object has low-resolution and/or are small. In one illustrative example, more than 55% of Pascal3D+ validation detections have a resolution below 224×224 pixels.

Some art approaches may use a VGGlike network architecture that only employs 3×3 convolutions. Such small convolution kernels perform poorly at extracting features from oversmoothed images. No specific steps are taken to address the challenges of oversmoothed images.

The CNNs used herein can use a network with larger kernel sizes, such as a ResNet50 network that uses 7×7 kernels in the first convolutional layer. The performance of the above-described approach can be compared with VGG- and ResNet-backends, as in Table 1 below. Table 1 shows results of viewpoint estimation using ground truth detections on Pascal3D+ with different setups of the techniques described herein (using VGG- and ResNet-backends). As shown, Table 1 presents quantitative results for 3-DoF viewpoint estimation on Pascal3D+ using different setups, starting from a baseline using VGG to a more elaborate version building on ResNet. Specific implementation details and other parameters are provided below. For the baseline approach (denoted as VGG in Table 1), the system builds on VGG and fine-tunes the entire network for the pose estimation and model retrieval tasks. As can be seen from Tables 1 and 2, this baseline already matches the state-of-the-art. The ResNet-backend outperforms the VGG-backend while the total number of network parameters is lower (VGG: 135M vs. ResNet: 24M).

TABLE 1

|  | MedErr | $Acc_{\frac{\pi}{6}}$ |
| --- | --- | --- |
| VGG | 11.7 | 0.8076 |
| VGG + blur | 11.6 | 0.8033 |
| ResNet | 10.9 | 0.8341 |
| ResNet + blur | 10.9 | 0.8392 |

The above-described techniques for 3D pose estimation are now evaluated on Pascal3D+. The above-described techniques for 3D model retrieval are also evaluated from Pascal3D+ and ShapeNet.

Performing 3D pose estimation on Pascal3D+ can raise various challenges. One challenge includes 2D object detection followed by a simplified 1-DoF viewpoint estimation (e.g., for the rotation). Another challenge deals with 3-DoF viewpoint estimation under the assumption of known ground truth detections. Focus will be made on the latter challenge, since it is more challenging from the perspective of pose estimation.

The geodesic distance:

$$\Delta(R_{gt}, R_{pred}) = \frac{\|\log(R_{gt}^T R_{pred})\|_F}{\sqrt{2}} \qquad \text{Equation (6)}$$

can be used to measure the difference between the ground truth viewpoint rotation matrix $R_{gt}$ and the predicted viewpoint rotation matrix $R_{pred}$. Two metrics acan be evaluated based on this distance measure: MedErr (the median of all viewpoint differences) and $$Acc_{\frac{\pi}{6}}$$

(the percentage of all viewpoint differences than $$\frac{\pi}{6}$$

or 30 degrees).

Full 3D pose estimation for arbitrary object categories on Pascal3D+ is a difficult task. In some cases, easier tasks can be defined, resulting in two main challenges. One challenge is that there is no a-priori information about the task: 2D objected detection (correct if Intersection-over-Union IoU>50% overlap between detection box and ground truth 2D box) followed by a simplified 1-DoF viewpoint estimation (predicting azimuth discretized into 4, 8, 16, or 24 classes/bins). The prediction is only correct if both the detection and azimuth criterion are met.

The second challenge deals with 3-DoF viewpoint estimation assuming ground truth detections are known. In this case, as noted above, the geodesic distance:

$$\Delta(R_1, R_2) = \frac{\|\log(R_1^T R_2)\|_F}{\sqrt{2}} \qquad \text{Equation (7)}$$

is used to measure the difference between two viewpoints/rotation matrices. Again, this measure is evaluated on the ground truth viewpoint $R_{gt}$ and the predicted viewpoint $R_{pred}$. Further, two metrics (MedErr and $$Acc_{\frac{\pi}{6}})$$

can be reported based on the distance measure.

Some techniques focus on the task of 3-DoF viewpoint estimation. The techniques described herein not only predict the 3 DoF object viewpoint (rotation), but also predict the 3-DoF object position (translation). Such predicted full 6-DoF object poses can be used to refine the initial object localization (the 2D detection box). As described above, this is done by projecting the center of the 3D bounding box of the object given the computed 6-DoF pose and predicted 3D dimensions. As a result the localization given by a 2D object detector can be less accurate, since the object is not required to be in the center of the crop. Moreover, for many objects, the center of the 2D detection box is not identical to the projection of the objects 3D center. This eases the task of object detection and implements a coarse-to-fine strategy for 6-DoF pose estimation.

Table 2 below provides quantitative results of the above-described approach for 3 DoF viewpoint estimation on Pascal3D+. Considering performance across all categories (last column), the approach significantly outperforms the state of the art in both MedErr and $$Acc_{\frac{\pi}{6}}.$$

Considering performance on individual categories, the above-described approach either tops or comes close to the state of the art. However, the performance on two categories (boat and table categories) is significantly below the overall performance for all evaluated methods. Reasons for this are analyzed below.

The category "boat" is a challenging category, due to the large intra-class variability in shape and appearance. Many detections for this category are of low resolution and objects are barely visible due to fog or mist. Additionally, there are lots of front/back ambiguities for images of objects in this category. Nevertheless, using the techniques described herein, state-of-the-art accuracy is achieved for this challenging category.

TABLE 2

|  | aero | bike | boat | bottle | bus | car | chair | table | mbike | sofa | train | tv | mean |
|---|---|---|---|---|---|---|---|---|---|---|---|---|---|
|  | category-specific | | | | | | | | | | | | |
| MedErr | 11.2 | 15.2 | 37.9 | 13.1 | 4.7 | 6.9 | 12.7 | N/A | N/A | 21.7 | 9.1 | 38.5 | N/A |
| MedErr* | 8.0 | 13.4 | 40.7 | 11.7 | 2.0 | 5.5 | 10.4 | N/A | N/A | 9.6 | 8.3 | 32.9 | N/A |
| MedErr | 13.8 | 17.7 | 21.3 | 12.9 | 5.8 | 9.1 | 14.8 | 15.2 | 14.7 | 13.7 | 8.7 | 15.4 | 13.6 |
| MedErr | 13.6 | 12.5 | 22.8 | 8.3 | 3.1 | 5.8 | 11.9 | 12.5 | 12.3 | 12.8 | 6.3 | 11.9 | 11.1 |
| MedErr** | 15.4 | 14.8 | 25.6 | 9.3 | 3.6 | 6.0 | 9.7 | 10.8 | 16.7 | 9.5 | 6.1 | 12.6 | 11.7 |
| MedErr (Dscrbd herein) | 10.0 | 15.6 | 19.1 | 8.6 | 3.3 | 5.1 | 13.7 | 11.8 | 12.2 | 13.5 | 6.7 | 11.0 | 10.9 |
| $Acc_{\pi/6}$ | 0.81 | 0.77 | 0.59 | 0.93 | 0.98 | 0.89 | 0.80 | 0.62 | 0.88 | 0.82 | 0.80 | 0.80 | 0.8075 |
| $Acc_{\pi/6}$ | 0.78 | 0.83 | 0.57 | 0.93 | 0.94 | 0.90 | 0.80 | 0.68 | 0.86 | 0.82 | 0.82 | 0.85 | 0.8103 |
| $Acc_{\pi/6}$** | 0.74 | 0.83 | 0.52 | 0.91 | 0.91 | 0.88 | 0.86 | 0.73 | 0.78 | 0.90 | 0.86 | 0.92 | 0.8200 |
| $Acc_{\pi/6}$ (Dscrbd herein) | 0.83 | 0.82 | 0.64 | 0.95 | 0.97 | 0.94 | 0.80 | 0.71 | 0.88 | 0.87 | 0.80 | 0.86 | 0.8392 |
|  | category-agnostic | | | | | | | | | | | | |
| MedErr (Dscrbd herein) | 10.9 | 12.2 | 23.4 | 9.3 | 3.4 | 5.2 | 15.9 | 16.2 | 12.2 | 11.6 | 6.3 | 11.2 | 11.5 |
| $Acc_{\pi/6}$ (Dscrbd herein) | 0.80 | 0.82 | 0.57 | 0.90 | 0.97 | 0.94 | 0.72 | 0.67 | 0.90 | 0.80 | 0.82 | 0.85 | 0.8133 |

In Table 2, viewpoint estimation are shown using ground truth detections on Pascal3D+. The results with the annotation "(Dscbd herein)" are the results using the above-described techniques. Results annotated with * are achieved assuming that the ground truth 3D model is known during test time, while the techniques described herein do not require this information. Results annotated with ** are achieved by training on vast amounts of rendered images from ShapeNet, instead of Pascal3D+ training data.

The techniques described herein provide class-agnostic (or category-agnostic) pose estimation. The results reported in Table 2 are class-specific, meaning that there is a separate output layer for each category and the ground truth category must be known at test time. The above-described techniques are able to make class-agnostic predictions and to generalize across different categories with just a small drop in overall performance. For example, the final layer can have only one pose output that can be used for the categories, making the approach scalable. The class-agnostic pose estimation even outperforms the previous class- or category-specific state-of-the-art for some categories, because it fully leverages the mutual information between similar categories, such as, for example, the "bike" and "mbike" categories shown in Table 2.

The "train" category, for example, benefits from the agnostic setup, because the shape and appearance of trains are similar to that of buses. The agnostic CNN takes advantage of this additional information and shows improved results for the train category compared to a class-specific CNN. An improvement is also seen for the "table" category, which is less significant, however, due to the low number of validation samples for this category.

Table 3 shows 3D model retrieval results using ground truth detections on Pascal3D+.

In some cases, rotating objects may not improve the results. One reason for this can be that over 90% of all images have theta between −10 and 10 degrees. Also, objects of most categories sit on planar surfaces (cars, buses, trains, or the like), and images show sky in the top and floor in the bottom part. Having floor on the top image part is not present in the data and the CNN may become confused by these images, as it also learns features from the background.

Pascal3D+ features around ten 3D models per category. None of these models have material or texture. ShapeNet provides up to 6787 3D models per category of highly diverse shape, texture, and material. By learning a metric between real world images and 3D renderings of the same viewpoint, the techniques described herein can retrieve an appropriate 3D model without human interaction.

The above-described techniques provide a tool for semi-automatic generation of new training data, by predicting a reliable 3D pose as well as an appropriate 3D model. Such techniques are the first 3D model retrieval approach that is trained on real and synthetic data, compared to other approaches that are purely trained on synthetic data. Moreover, hidden feature activations of a CNN trained for 3D pose estimation can be used for 3D model retrieval.

Figure 13A:
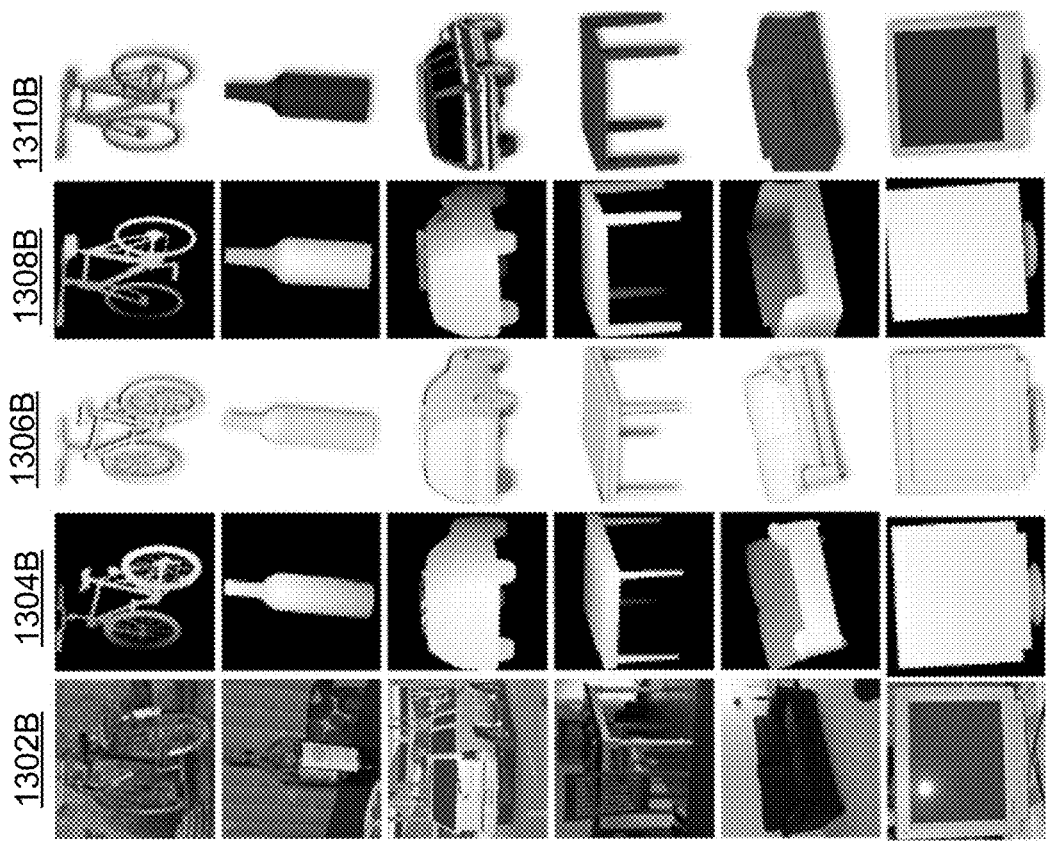
FIG. 13A and FIG. 13B are images illustrating examples of input images including objects with certain poses and rendered image with 3D models of the objects in the poses, in accordance with some examples.
Figure 13B:
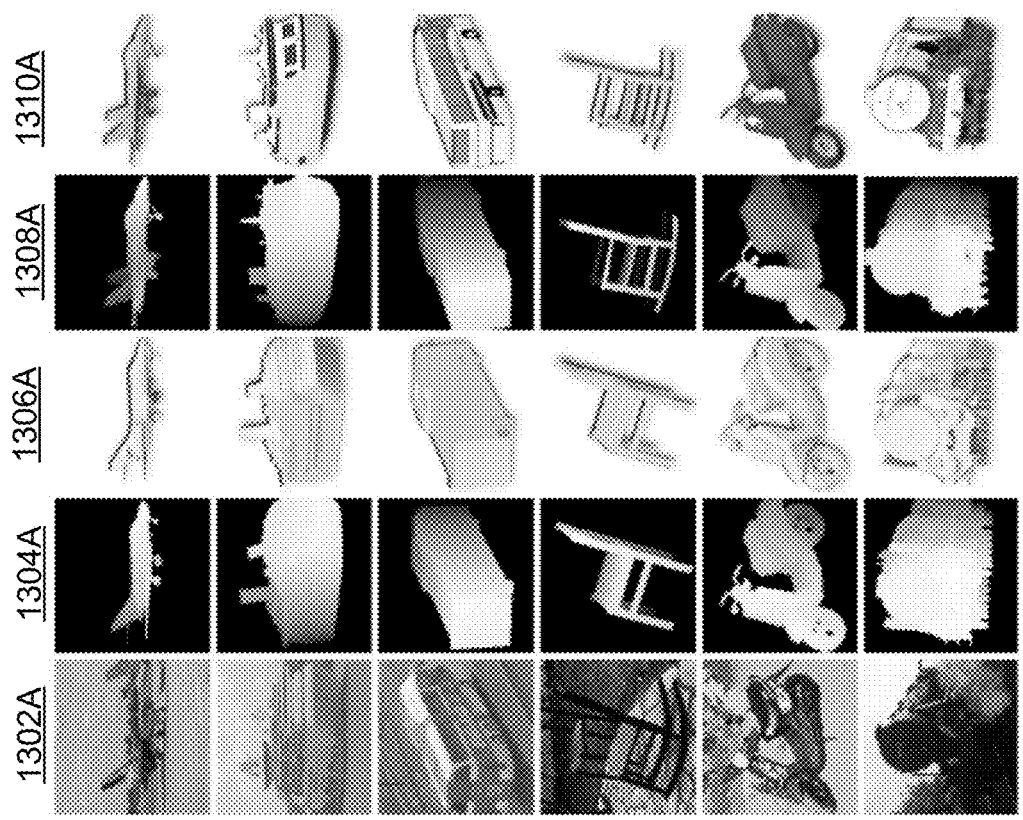

FIG. 13A and FIG. 13B show qualitative results for 3D pose estimation and 3D model retrieval on Pascal3D+ and ShapeNet for 12 different categories. Examples of query RGB images (input images) are shown in columns 1302A (FIG. 13A) and 1302B (FIG. 13B). Columns 1304A and 1304B show the depth images and columns 1306A and 1306B show the RGB renderings of the ground truth 3D models from Pascal3D+ under the ground truth poses from Pascal3D+. Columns 1308A and 1308B show the depth images and columns 1310A and 1310B show the RGB renderings of retrieved 3D models from ShapeNet under the predicted poses.

TABLE 3

|  | aero | bike | boat | bottle | bus | car | chair | table | mbike | sofa | train | tv | mean |
| --- | --- | --- | --- | --- | --- | --- | --- | --- | --- | --- | --- | --- | --- |
| Top-1-Acc (Rand) | 0.15 | 0.21 | 0.36 | 0.25 | 0.25 | 0.10 | 0.15 | 0.10 | 0.28 | 0.31 | 0.27 | 0.27 | 0.2250 |
| Top-1-Acc (Cano) | 0.12 | 0.25 | 0.38 | 0.35 | 0.45 | 0.21 | 0.20 | 0.15 | 0.20 | 0.21 | 0.49 | 0.50 | 0.2925 |
| Top-1-Acc (OH) | 0.48 | 0.33 | 0.58 | 0.41 | 0.75 | 0.38 | 0.28 | 0.19 | 0.44 | 0.28 | 0.62 | 0.63 | 0.4375 |
| Top-1-Acc (Pred) | 0.48 | 0.31 | 0.60 | 0.41 | 0.78 | 0.41 | 0.29 | 0.19 | 0.43 | 0.36 | 0.65 | 0.61 | 0.4600 |
| Top-1-Acc (GT) | 0.53 | 0.38 | 0.51 | 0.37 | 0.79 | 0.44 | 0.32 | 0.43 | 0.48 | 0.33 | 0.66 | 0.72 | 0.4967 |

Considering 3D pose estimation on Pascal3D+, some forms of data augmentation are relevant, while others are not. Learning with blurred samples can give an improvement of about +0.5% (see Table 1). Samples can be augmented for which the longer edge of the ground truth detection box is greater than 224 pixel by applying Gaussian blurring with various kernel sizes and σ. However, experiments show that a VGG-based network does not benefit from blurred samples. This may be in part due to the fact that VGG solely uses 3×3 convolutions which are not suited for features extraction from oversmoothed images.

In some examples, the model retrieval system 104 can be trained with occluded and truncated objects. In some examples, the model retrieval system 104 can exclude detections which are marked as occluded or truncated. For example, in some cases, learning with and without occluded and truncated samples can lead to the same results. As a result, the training time can be reduced by discarding these samples without decreasing performance.

In some cases, the ground truth object locations can be jittered for the training set to be robust to imperfect localization at test-time.

Figure 12:
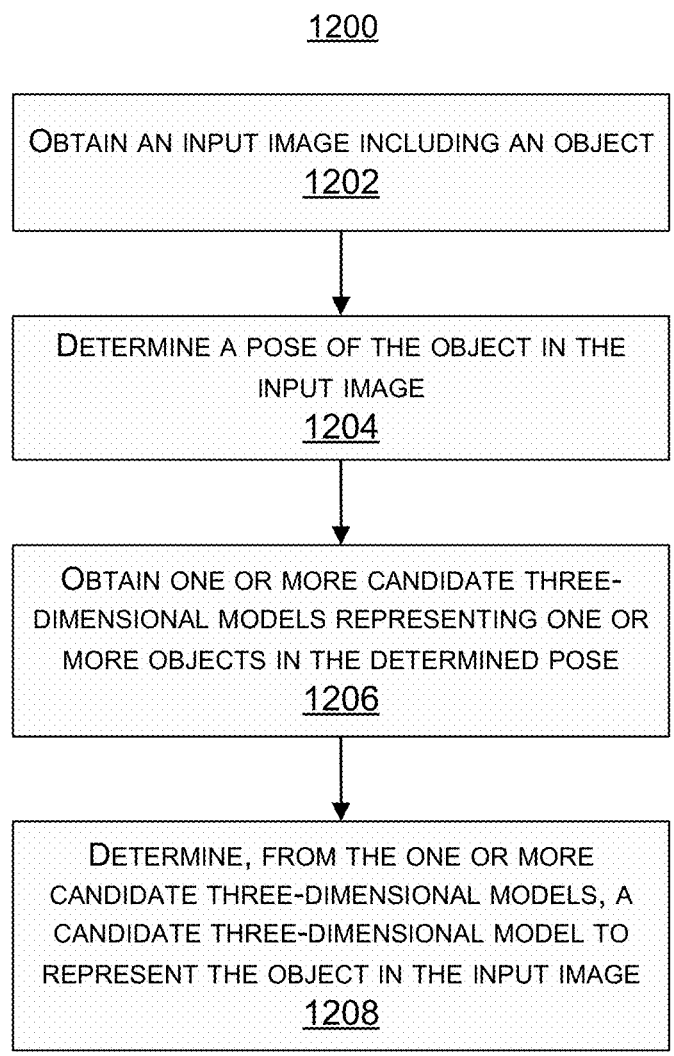
FIG. 12 is a flowchart illustrating an example of a process of estimating a pose of an object, in accordance with some examples.

FIG. 12 illustrates an example of a process 1200 of selecting a three-dimensional model using the techniques described herein. At block 1202, the process 1200 includes obtaining an input image including an object. An example input image 202 is shown in FIG. 2A.

At block 1204, the process 1200 includes determining a pose of the object in the input image. The pose of the object can be determined using any suitable technique, such as those described herein. The pose can be determined by the pose estimation system 108 or the pose estimation system 608. For example, determining the pose of the object in the input image can include determining a plurality of two-dimensional projections of a three-dimensional bounding box of the object in the input image, and estimating the pose of the object using the plurality of two-dimensional projections of the three-dimensional bounding box.

In some cases, the plurality of two-dimensional projections of the three-dimensional bounding box are determined by applying a trained convolutional network to the image. An example of the trained convolutional network is the real domain CNN 220 shown in FIG. 2A. The trained convolutional network is trained to predict two-dimensional projections of the three-dimensional bounding box of the object in a plurality of poses.

In some examples, estimating the pose of the object using the plurality of two-dimensional projections of the three-dimensional bounding box includes applying a perspective-n-point (PnP) problem using correspondences between the predicted two-dimensional projections and three-dimensional points of the three-dimensional bounding box that correspond to the predicted two-dimensional projections. For example, the correspondences can include the the 2D-3D correspondences described above, which include a correspondence between a 3D location of a point of the bounding box of an object (e.g., a 3D corner of the bounding box) and the 2D projection in the image of that point on the bounding box. In some examples, the process 1200 can determining the three-dimensional points of the three-dimensional bounding box by predicting one or more spatial dimensions of the three-dimensional bounding box and using the one or more spatial dimensions to scale a unit cube. For example, as described above, the spatial dimensions $D=[d_x, d_y, d_z]$ of the object's 3D bounding box can be determined. The spatial dimensions D can then be used to scale a unit cube which approximates the ground truth 3D coordinates. For instance, the unit cube can be scaled using the spatial dimensions so that the 3D coordinates of the corners of the unit cube are at similar locations as the object's 3D bounding box.

At block 1206, the process 1200 includes obtaining one or more candidate three-dimensional models representing one or more objects in the determined pose. In some examples, the one or more candidate three-dimensional models include one or more three-dimensional meshes representing the one or more objects. For example, a 3D model of a boat can be represented as a 3D mesh in a database. In some cases, obtaining the one or more three-dimensional models representing the one or more objects includes obtaining a plurality of three-dimensional models representing a plurality of objects, and selecting a subset of the plurality of three-dimensional models as the one or more candidate three-dimensional models. An example of the plurality of three-dimensional models is shown in FIG. 2A as input 3D models 206.

In some examples, the process 1200 can determine a category of the object in the input image. The plurality of three-dimensional models can be filtered based on the category. For example, the process 1200 can determine one or more categories associated with the plurality of candidate three-dimensional models. In such examples, the one or more candidate three-dimensional models are selected from the plurality of candidate three-dimensional models based on the one or more candidate three-dimensional models having the category of the object in the input image.

At block 1208, the process 1200 includes determining, from the one or more candidate three-dimensional models, a candidate three-dimensional model to represent the object in the input image. An example of a candidate three-dimensional model determined to represent an object in an input image is shown as retrieved 3D model 216 in FIG. 2A. In some cases, a user can have an option to accept or reject the determined candidate three-dimensional model. For example, an indication representing the determined three-dimensional model can be output for the user. In one illustrative example, the determined three-dimensional model can be displayed (e.g., over the input image). The user can then provide input to a computing device indicating whether the user accepts or rejects the determined candidate three-dimensional model. If the user rejects the determined candidate three-dimensional model, other candidate three-dimensional models that could be used to represent the object can be provided as options to the user. For example, a certain number (e.g., 1, 2, 3, or other suitable number) of candidate three-dimensional models that have descriptors within a certain similarity to the descriptor generated for the object in the input image (e.g., based on a nearest neighbor search, as described herein) can be selected as the other candidate three-dimensional models. The user can then be provided with an option to select one of the other candidate three-dimensional models. In some cases, if the user rejects the determined candidate three-dimensional model, the process 1200 can automatically select a different candidate three-dimensional model for representing the object. For example, a candidate three-dimensional model that has a next closest descriptor to the descriptor generated for the object in the input image (e.g., based on a nearest neighbor search, as described herein) can be selected as the other candidate three-dimensional model. In such cases, the user can again be provided with an option to accept or reject the different candidate three-dimensional model.

In some examples, the process 1200 can include generating an output image based on the candidate three-dimensional model and the input image. In some cases, the output image can include an image (e.g., the input image or other image) that includes the candidate three-dimensional model of the object instead of a two-dimensional representation of the object. In some cases, the output image can be displayed.

In some examples, the process 1200 can adjust a pose, a location, or both the pose and the location of the candidate three-dimensional model in an output image. The pose and/or location can be adjusted based on user input, based on the object represented by the candidate three-dimensional model being in a different pose and/or location in an input image, a combination thereof, or based on any other suitable input. In one illustrative example, the process 1200 can include receiving a user input to manipulate the candidate three-dimensional model, and adjusting one or more of the pose or the location of the candidate three-dimensional model in the output image based on the user input. In one example, the process 1200 can receive user input requesting movement of the object (represented by the three-dimensional model) from a first location (and/or from a first pose) to a second location (and/or to a second pose). In response, the process 1200 can adjust the location of the three-dimensional model from the first location (and/or from the first pose) to the second location (and/or to the second pose) in an output image.

In another illustrative example, the process 1200 can include obtaining an additional input image. The additional input image includes the object in a different pose, in a different location, or both a different pose and location than a pose and/or location of the object in the input image that was obtained at block 1202). The process 1200 can adjust one or more of the pose or the location of the candidate three-dimensional model in an output image based on a difference between the pose or location of the object in the additional input image and the pose or location of the object in the input image. For example, if the object (represented by the three-dimensional model) moves from a first location (and/or from a first pose) in the input image to a second location (and/or to a second pose) in the additional input image, the process 1200 can adjust the location of the three-dimensional model to the second location (and/or to the second pose) in an output image.

In some examples, the process 1200 includes generating one or more images for the one or more candidate three-dimensional models. In some examples, the one or more images generated for the one or more candidate three-dimensional models include one or more depth maps. The one or more images are generated to include the one or more objects in the determined pose. For example, as shown in FIG. 2A, the rendered depth maps 222 show six depth images rendered for six candidate 3D models. The process 1200 can generate a descriptor for the object in the input image, and can also generate one or more descriptors for the one or more images (e.g., depth maps) generated for the one or more candidate three-dimensional models.

The process 1200 can determine the candidate three-dimensional model (at block 1208) based on the descriptor generated for the object and the one or more descriptors generated for the one or more images. For example, the process 1200 can include comparing the one or more descriptors generated for the one or more images to the descriptor generated for the input image. In some cases, comparing the one or more descriptors generated for the one or more images to the descriptor generated for the input image can include performing a nearest-neighbor search using the descriptor generated for the input image as input. In some examples, the process 1200 can optimize for the similarity loss, using equation (4) described above. The process 1200 can then determine a descriptor from the one or more descriptors generated for the one or more images that has a closest match to the descriptor generated for the input image. For instance, the descriptor out of the one or more descriptors generated for the one or more images that is determined to be a closest match (e.g., based on a nearest neighbor search, or other suitable similarity determination) to the descriptor generated for the input image is determined. In such examples, the process 1200 can determine the candidate three-dimensional model (at block 1208) based on the descriptor from the one or more descriptors having the closest match to the descriptor generated for the input image. For example, the candidate three-dimensional model (from the one or more candidate three-dimensional models) from which the image (e.g., depth map or other suitable image) that the descriptor was calculated from can be selected as the candidate three-dimensional model.

In some examples, the process 1200 may be performed by a computing device or an apparatus. In one illustrative example, the process 1200 can be performed by the model retrieval system 104 shown in FIG. 1. In some cases, the computing device or apparatus may include a processor, microprocessor, microcomputer, or other component of a device that is configured to carry out the steps of process 1200. In some examples, the computing device or apparatus may include a camera configured to capture images. For example, the computing device may include a camera device. As another example, the computing device may include a mobile device with a camera (e.g., a mobile phone or tablet including a camera, or other type of device with a camera). In some cases, the camera device can include communications transceiver and/or a video codec. In some cases, the computing device may include a display for displaying images. In some examples, a camera or other capture device that captures the video data is separate from the computing device, in which case the computing device receives the captured video data. The computing device may further include a network interface configured to communicate the video data. The network interface may be configured to communicate Internet Protocol (IP) based data or any other suitable data.

Process 1200 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1200 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

The above described systems and methods allow a 3D mesh (or 3D model) to be selected for an object in an image. Experiments based on the Pascal3D dataset show that the techniques described herein can select the same meshes as those that human annotators would choose for a large number of the input images, and can select meshes that correspond well to the objects for the rest of the images, sometimes even better than the meshes chosen by the annotators. Using the entire ShapeNet dataset, for example, new meshes can also be identified that match well with the objects in the Pascal3D dataset.

Examples are now described detailing an object detection technique as well as another example of a pose estimation technique that can be used in addition to the pose-estimation technique described above. In some cases, as noted above, the pose estimation system 108 can perform object localization to detect one or more target objects in an input image. To perform object localization, the pose estimation system 108 can determine an image patch (also referred to herein as a window W) of an input image in which a target object is located. For instance, the two-dimensions (2D) center of the target object in the input image can be identified by determining an image patch centered on the object. In some examples, as noted below, 2D projections of the 3D bounding box of the object can be determined by applying a trained regressor to the image patch (or window W) centered on the object. Further details of performing object localization are described below with respect to FIG. 9A-FIG. 10.

The pose estimation system 108 can perform different types of 3D pose estimation than that described above to determine the poses of the target objects. An illustrative example of another pose estimation technique will now be described. For example, using the technique described below, a color image can be used as the sole input, without requiring depth information. A pose can be determined using RGB data without using depth data, in which case an RGB-depth (RGB-D) image is not necessary. One of ordinary skill will appreciate that any other suitable pose estimation technique can be used.

A regressor can be trained to predict the 3D pose of a target object given an entire input image or given a patch or window of the image centered on the object, even under cluttered background and partial occlusion. The regressor can be trained to predict the 3D pose of an object "holistically," directly from a color image of the image. The 3D pose of the object of interest can be predicted even when the image containing the object contains other objects in the background or objects partially occluding the object of interest, despite the difficulty of such a problem. This avoids the need for predicting the object coordinates and the RANSAC optimization as intermediate steps. The regressor can include a convolutional neural network (CNN). Once trained, the regressor can then be applied to image locations determined using the object localization technique described below.

In some examples, the predicted 3D pose can be represented directly by a translation and a rotation (or orientation). In some examples, even better accuracy may be achieved in some instances by predicting 2D projections of a bounding box of the object (e.g., 2D projections of the corners of the bounding box), and then computing the 3D pose from these 2D-3D correspondences. For example, a correspondence of the 2D-3D correspondences can include a correspondence between the 3D location of a point of the bounding box (e.g., a 3D corner of the bounding box) and the 2D projection in the image of that point on the bounding box, as predicted by the regressor. A difference from other approaches is that these predictions are typically outlier-free, and RANSAC is not needed. Moreover, using the 2D projections may also avoid the need for meta-parameters to balance the translation terms and the rotation terms.

In some examples, for improved accuracy, a second regressor (e.g., a CNN or other suitable machine learning technique) can be trained to update the 2D projections of the bounding box of an object, by comparing the input image and a rendering of the object for the initial pose estimate. For example, the network can be applied for a number of iterations to improve the pose accuracy. Training the regressor to update the 2D projections can result in a simple, efficient, and accurate method.

FIG. 4 shows an example of a regressor 404 configured to implement one or more aspects described herein. The regressor 404 is trained using training images 402. In some examples, the training images 402 can include entire images in which a target object of interest is located and undergoing one or more poses. In some examples, the training images 402 can include a training set made of image windows (denoted as W herein) containing the target object under one or more poses. Based on the training, the regressor 404 generates mappings 410 that can be stored and used for application to one or more input images to determine a 3D pose of one or more objects in the input images. The regressor 404 can use one or more convolutional neural networks (CNNs). As described in more detail below, the trained regressor 404 can be used to predict 2D projections of a bounding box of a target object in an image, which can then be used to compute the 3D pose of the object in an input image.

In some examples, for each of the training images 402, corresponding poses of a target object and 3D points of a bounding box of the object are known. For example, the 3D locations of the target object's bounding box points (e.g., corners of the bounding box) are already known during the training, as a 3D model of the object is known. The 3D points therefore do not need to be predicted during training. During the training phase, the 3D locations are used—they are projected to the image, using a ground truth pose, to get the 2D projections. The 3D location determination engine 404 can determine the 3D locations of the points of the bounding box in each of the training images 402. Any 3D points on an object's bounding box can be determined by the 3D location determination engine 404. In some examples described herein, the 3D locations of the corners of an object's bounding box may be determined and used to train the regressor 404. However, one of ordinary skill will appreciate that any point along an object's bounding box can be used. In one illustrative example, for a first training image with a target object in a known pose, the 3D locations of the corners of the target object's bounding box in the pose are determined by the 3D location determination engine 404.

Figure 5:
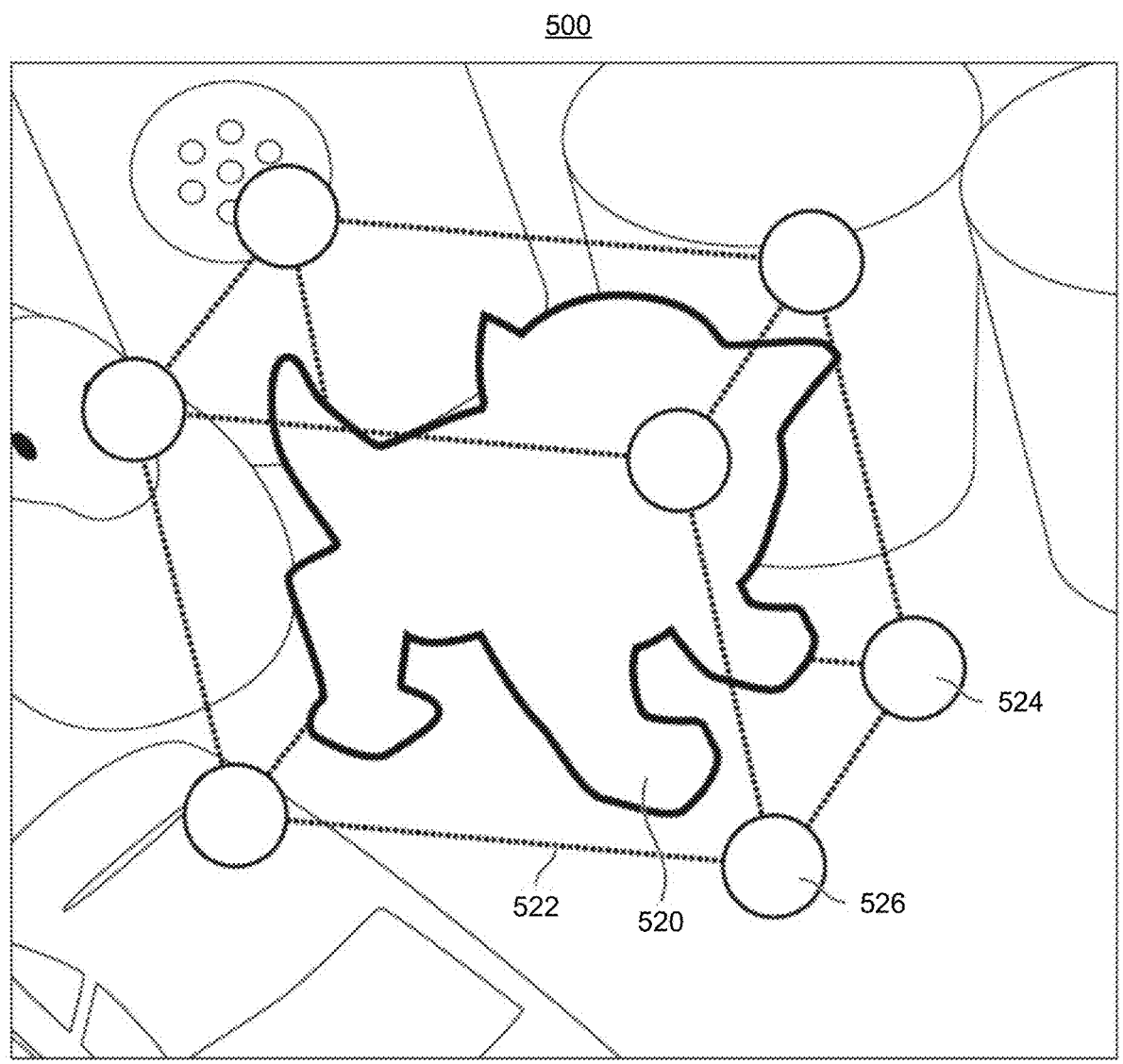
FIG. 5 is an illustration of an image in which a bounding box is shown with two-dimensional projections, in accordance with some examples.

A 2D projection engine 410 can then determine 2D projections that correspond to the determined 3D locations of the points on the target object's bounding box. For example, the 2D projection engine 410 can determine the 2D projections by projecting the determined 3D locations of the corners of the bounding box (e.g., the eight corners of a bounding box surrounding a target object) onto an image plane of each training image. Any suitable image projection technique for projecting 3D points of an object to an image plane may be used by the 2D projection engine 410. FIG. 5 shows an example of an image 200 of a cat object 520 and a bounding box 522 of the cat object 520. The 2D projections of the eight corners of the bounding box are shown with dots on each corner, including 2D projection 524 and 2D projection 526.

The image-to-2D-projection mapping engine 408 can generate mappings 410 based on the training. The mappings 406 can map an image with an object to the corresponding two-dimensional projections of the points on the bounding box of the object (e.g., the corners). During run-time when an input image is processed for determining a 3D model for representing a target object in the image, the 3D pose of the object can be computed by mapping an input image with an object to the corresponding two-dimensional projections of the points on the bounding box. For example, by training the regressor 404 to identify 2D projections of a bounding box for a target object exhibiting different poses in the various training images, the pose estimation engine 632 described below can use the trained regressor 404 to identify the 2D projections of the target object's bounding box for an input image. The 2D projections can then be used to determine the 3D pose of the target object in the input image.

Figure 6:
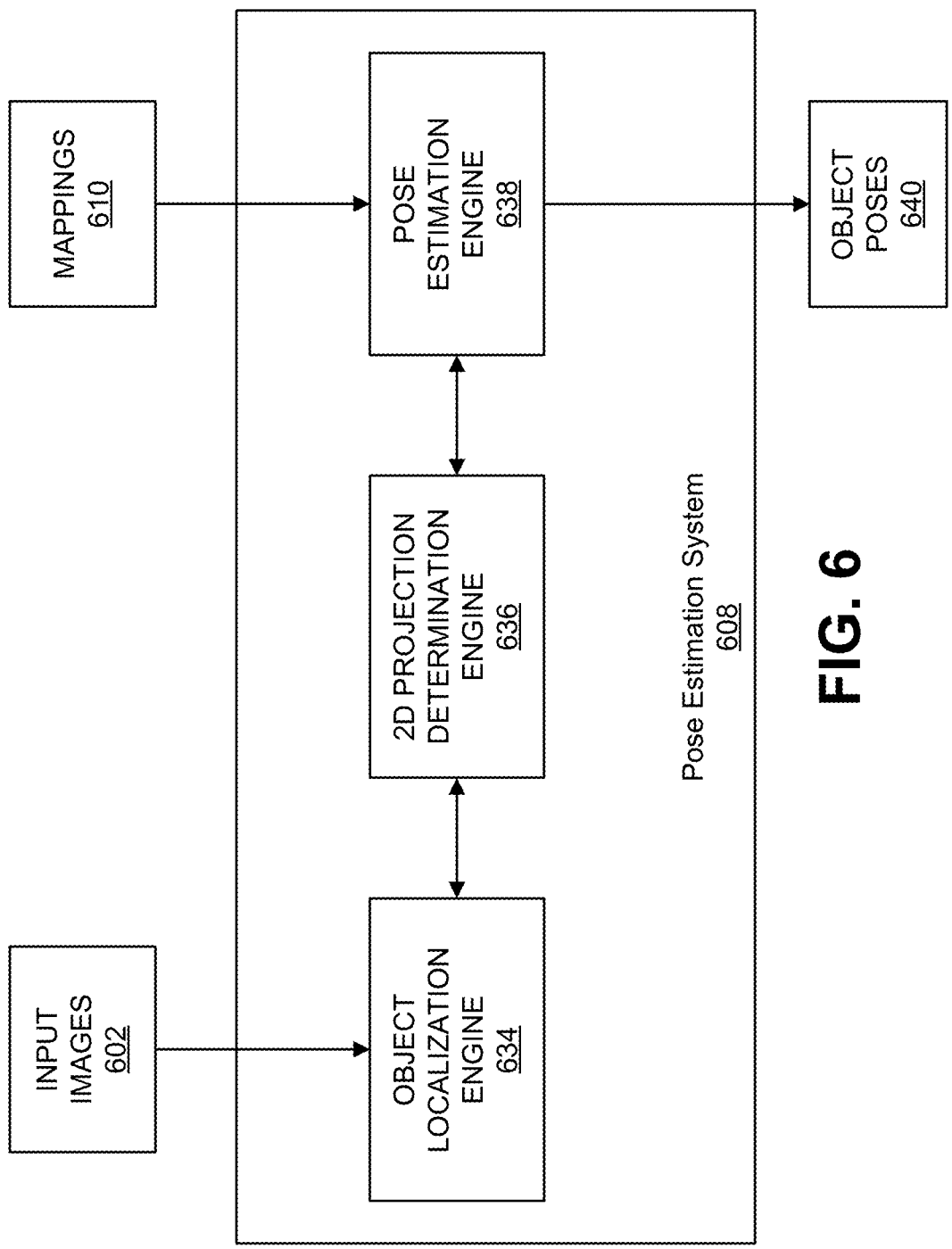
FIG. 6 is a block diagram illustrating an example of a pose estimation system, in accordance with some examples.

FIG. 6 shows an example of the pose estimation system 608. The pose estimation system 608 is an example implementation of the pose estimation system 108 shown in FIG. 1. The pose estimation system 608 can estimate 3D object poses 640 of a target object in input images 602 that are obtained by the pose estimation system 608. The input images 602 can include color images, such as RGB images. For example, given a single color input image (e.g., an RGB image) including the target object, the pose estimation system 608 can estimate the 3D pose of the target object in the input image. The 3D pose can be estimated by the pose estimation system 608 based on the 2D projections of points on the object's 3D bounding box (e.g., the corners of the bounding box).

Figure 7:
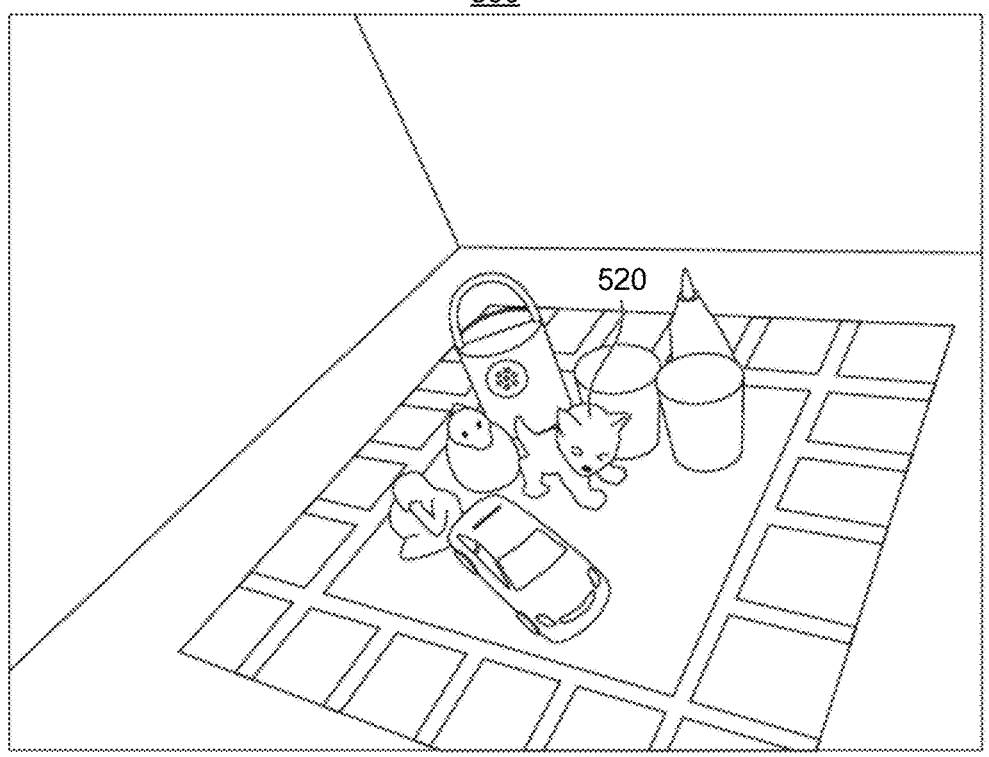
FIG. 7 is an illustration of an input image, in accordance with some examples.
Figure 8:
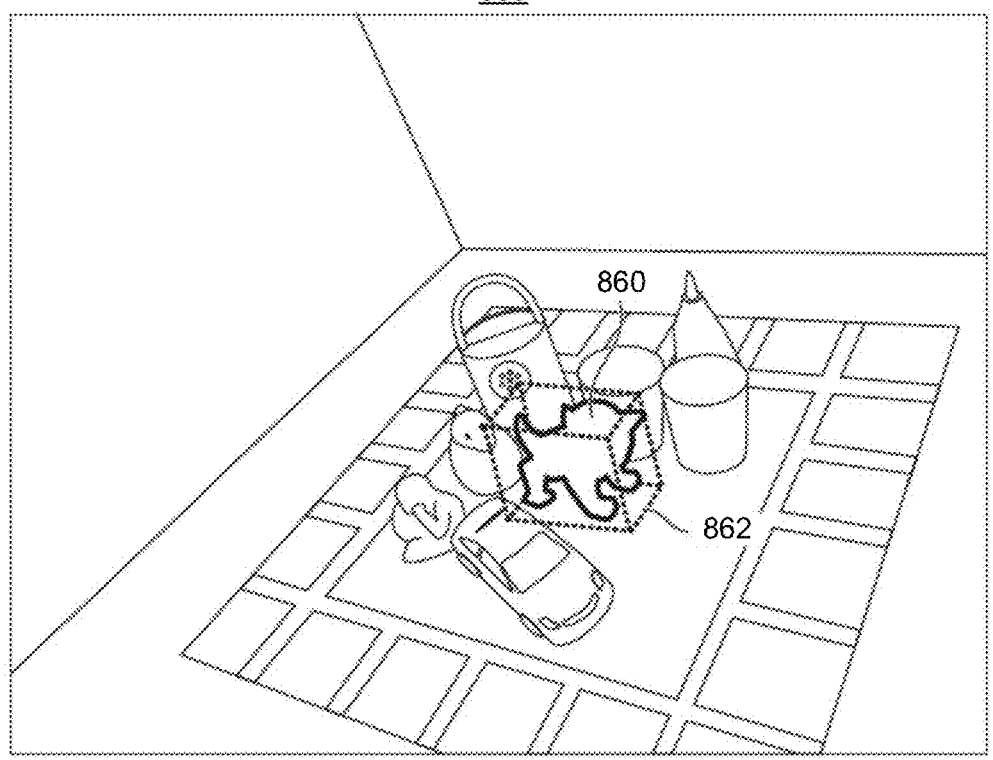
FIG. 8 is an illustration of an output image, in accordance with some examples.

The 2D projection determination engine 636 can use the trained regressor 404 and the mappings 610 described above to identify the 2D projections of the points on the target object's bounding box for an obtained input image. FIG. 7 shows the input image 500 with the cat object 520. As noted previously, the points can include the corners of the bounding box, such as the corners of the bounding box 522 (e.g., 2D projections 524 and 526) of the cat object 520 shown in FIG. 5. As described in further detail below, the pose estimation engine 638 can then use the 2D projections to determine the 3D pose of the target object in the input image. The pose estimation engine 638 can output the object poses 640 including the poses determined from the input images 602. FIG. 8 illustrates an example of an output image 800 with the object pose 860 of the cat object 520 and its bounding box 862.

Various implementations can be used to estimate the 2D projections of a target object's 3D bounding box given an image or an image window centered on the target object, and to estimate the object pose using the 2D projections. As previously described, the regressor 404 can include a CNN, or other suitable Deep Neural Network. In some examples, the regressor 404 CNN can be trained to predict the 3D pose of a target object given an image window W centered on the object. Details regarding determination of the image window W (also referred to herein as a patch) are described further below with respect to the object localization engine 634. In other examples, the entire image can be used instead of the image window W.

In some examples, the regressor 404 CNN can be trained by minimizing the following cost function over the parameters Θ of the CNN:

$$\sum_{(W,e,t) \in \mathcal{T}} l(W, e, t; \Theta),  \qquad \text{Equation (8)}$$

where $\mathcal{T}$ is a training set made up of image windows W containing the object under a pose defined by an exponential map e and a 3D translation vector t. Each image window in the training set can have a different pose. The exponential map e is a way to parameterize a rotation, and is made of 3 values. At least two options can be used to predict or determine the 3D pose returned by the CNN, with one option including direct prediction of the pose and another option including predicting the pose through the 2D projections of the bounding box. The form of the loss function in Equation (8) changes depending on which option is used.

When direct prediction of a pose of a target object is used, the function can be expressed as the following in some examples:

$$l_d(W,e,t;\Theta) = \|R^T(e)R(e(f_\Theta(W))) - I\|_F^2 + \beta\|t - t(f_\Theta(W))\|^2. \qquad \text{Equation (9)}$$

The function e(•) returns the components of the output of the CNN $f_\Theta$ corresponding to the exponential map e. The function t(•) is similar to e(•), but returns the components of the output of the CNN $f_\Theta$ corresponding to the translation vector t. R(e) is the rotation matrix corresponding to the exponential map vector e. The form of the first term in Equation (9) allows the system to optimize over the rotation components without having to handle the fact that multiple representations correspond to the same rotation—this may be true for any rotation parameterization. At run-time (using the trained regressor 404), given an image window W centered on a target object of interest, the system simply has to invoke the trained CNN $f_\Theta(\cdot)$ to get an estimate of the pose (denoted as $(\hat{e}, \hat{t}) = f_\Theta(W)$) of the target object in the given image window W.

When predicting the pose of a target object through the 2D projections of the object's bounding box, the l function can be expressed as the following in some examples:

$$l_T(W, e, t; \Theta) = \sum_i \|Proj_{e,t}(M_i) - m_i(f_\Theta(W))\|^2, \qquad \text{Equation (10)}$$

where the $M_i$ are the 3D coordinates of the corners of the bounding box (or other points of the bounding box in some examples) in the object coordinate system. The term $Proj_{e,t}(M)$ projects the point M on the image plane from the pose defined by e (rotation) and t (translation). The function $m_i(\cdot)$ returns the components of the output of the CNN $f_\Theta$ corresponding to the predicted 2D projection coordinates of the i-th corner. At run-time (e.g., using the trained regressor 404 and the pose estimation system 608), given an image window W centered on a target object of interest, the 3D pose of the target object can then be estimated for the correspondences between the 3D points $M_i$ and the predicted $m_i(f_\Theta(W))$ using a pose estimation technique that estimates a pose given a set of 3D points in a world coordinate frame and their corresponding 2D points in the image. The 2D points in this example are the 2D projections estimated from an input image using the regressor CNN. In some examples, other 3D points could be used other than corners of the target object's bounding box. The corners of the bounding box are a natural choice as they encompass the object and are well spread in space.

One example of such a pose estimation technique that estimates a pose given a set of 3D points and their corresponding 2D points in the image includes perspective-n-point (PnP) algorithm. The PnP algorithm estimates a pose of a calibrated camera (relative to a target object in a certain pose) using a given set of n 3D points of the object's bounding box in world coordinates and their corresponding 2D projections in the image. The calibrated intrinsic camera parameters can also be used. The camera pose includes six degrees-of-freedom, including the rotation (e.g., roll, pitch, and yaw) and the 3D translation of the camera with respect to the world. Any suitable PnP technique can be used, including P3P, efficient PnP (EPnP), or other suitable PnP technique. One example of a PnP algorithm that can be used is described in Lepetit, V.; Moreno-Noguer, M; Fua, P. (2009). "*EPnP: An Accurate O(n) Solution to the PnP Problem*". *International Journal of Computer Vision*. 81 (2): 155-166, which is hereby incorporated by reference in its entirety and for all purposes.

In some examples, a refiner method can be performed to improve the accuracy of the pose estimates described above (using one or more of Equations 8-10). In some examples, the refiner method includes training a regressor (e.g., a convolutional neural network) to update the 2D projections of the bounding box of an object. The regressor used to update the 2D projections may include a different regressor than the regressor 404. The 2D projections can be updated by comparing an input image to a rendering of the object for an initial pose estimate. Another CNN (separate from the regressor 404 CNN $f_\Theta$) can be trained that predicts an update to improve the pose. The CNN can be denoted as $g_\mu$. The input to $g_\mu$ is two-fold. The first input is the image window W (or patch), as for the CNN $f_\Theta$. The second part of the input depends on the current estimate of the pose. For example, either a binary mask or a color rendering of the target object as seen from the current estimate can be used as the second input to $g_\mu$. In particular, the parameters $\mu$ of $g_\mu$ can be optimized by minimizing:

$$\sum_{(W,e,t)\in\mathcal{T}} \sum_{(\hat{e},\hat{t})\in\mathcal{N}(e,t)} l_{ref}(W, e, t, \hat{e}, \hat{t}; \mu),$$ Equation (11)

where $\mathcal{N}(e, t)$ is a set of poses sampled around a particular pose (e, t). The loss function $l_{ref}(\cdot)$ is defined as:

$$l_{ref}(W,e,t,\hat{e},\hat{t};\mu) = \Sigma_i \|\text{Proj}_{e,t}(M_i) - \text{Proj}_{\hat{e},\hat{t}}(M_i) - m_i(g_\mu(W, \text{Render}(\hat{e},\hat{t})))\|^2,$$ Equation (12)

where Render(e, t) is a function that returns a binary mask, or a color rendering, of the target object seen from the pose (e, t). At run-time, given a current estimate of the object pose (represented by the projections of the corners $\hat{v} = [\ldots \hat{m}_i^T \ldots]^T$) and the corresponding parameterization $(\hat{e}, \hat{t})$, this estimate can be updated by invoking $g_\mu$:

$$\hat{v} \leftarrow \hat{v} + g_\mu(W, \text{Render}(\hat{e},\hat{t}))$$ Equation (13)

In some examples, the pose estimation system 608 can include an object localization engine 634. The object localization engine 634 can perform the object detection described above with respect to FIG. 1-FIG. 3 in order to detect one or more target objects in an input image. Some implementations of the pose estimation system 608 do not include the object localization engine 634, in which case the pose estimation system 608 and the object localization engine 634 are separate components or modules. The object localization engine 634 can determine an image region or patch (referred to as a window W above) of an image in which a target object of interest is located. For example, the object localization engine 634 can identify the 2D center of the target object in an input image by determining an image patch centered on the object. In some examples, as noted above, 2D projections of the 3D bounding box of the object can be determined by applying the trained regressor to the image patch (or window W) centered on the object.

In some examples, a standard 2D object detector can be used to localize a target object. In some examples, the object localization engine 634 can localize the target object in 2D approximately using segmentation, which can result in better performance and can provide accurate locations even under partial occlusions. In some cases, coarse-to-fine segmentation can be used to detect the 2D location of the target object. For example, a two-level coarse-to-fine object segmentation can be used by the object localization engine 634 to identify the center of the target object in an input image.

In general, object localization using segmentation includes splitting the input image into regions of a certain size in a first stage (e.g., 64×64, 128×128, 64×128, or any other suitable size). Each region can be segmented as a binary mask of a size determined by the region splitting of the input image (e.g., for a 128×128 split, each region can be segmented as a binary mask of a size 8×8). Only the largest component from the segmentation is kept, and each active location is segmented more finely in a second stage. A final result of the segmentation includes providing an estimated 2D center of the target object.

Figure 9A:
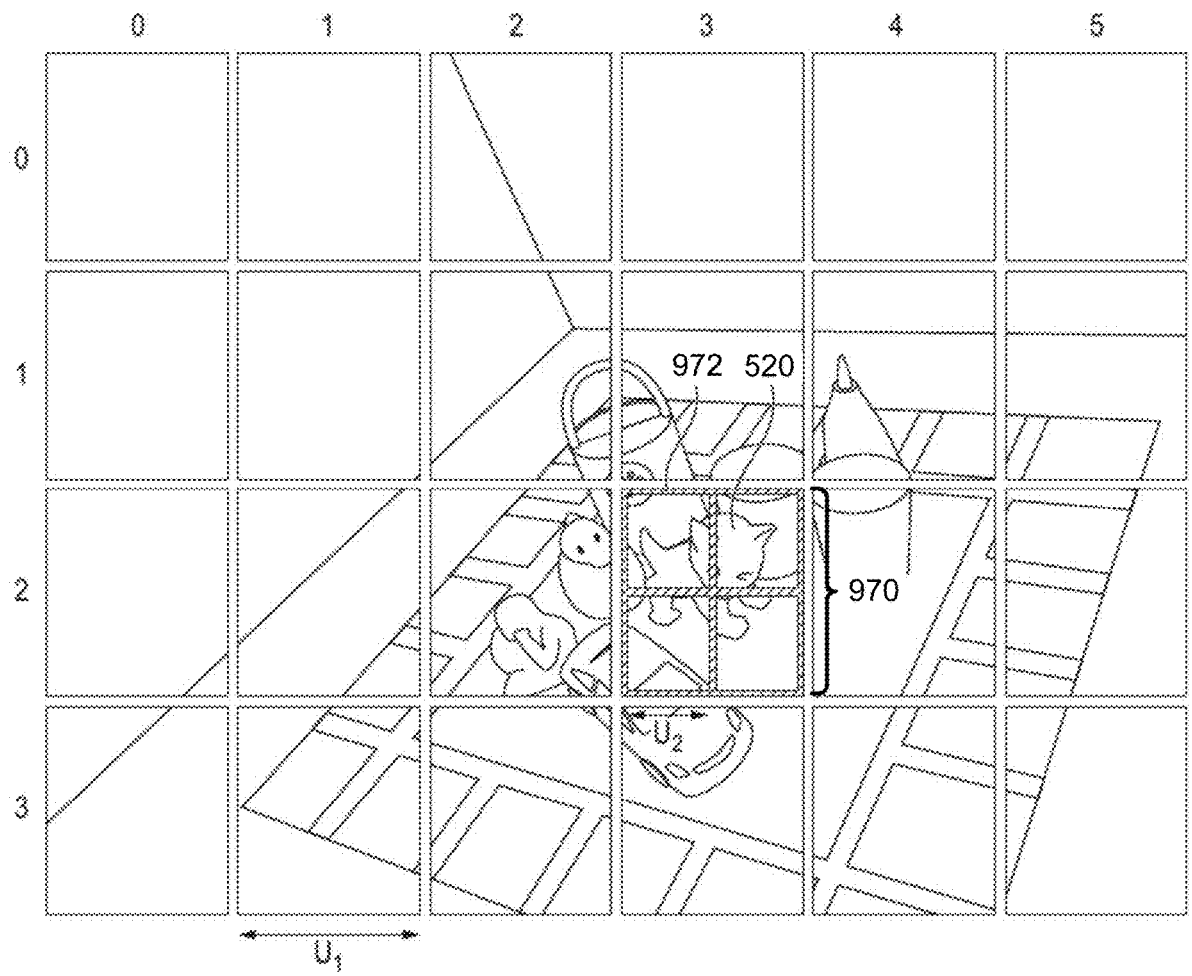
FIG. 9A is an illustration of an image for which an example of target object localization has been performed, in accordance with some examples.

In the first stage of the two-level coarse-to-fine object segmentation, the object localization engine 634 roughly locates the target object by a low resolution segmentation of the given input image, with an error of U1 pixels. In some examples, the first stage can be performed using a first localization regressor (e.g., a CNN or other suitable network). The first localization regressor used to perform the first stage may be different than the regressor 404 discussed above. FIG. 9A illustrates an image 900 for which the two-level coarse-to-fine object segmentation has been performed to locate the cat object 520. In the example of FIG. 9A, the segmentation of the first stage segments the image 900 into an object area map having a grid of N×M object area blocks. The example in FIG. 9A includes an object area map having dimensions of 4 rows×6 columns. The object localization engine 634 can determine a respective probability for each of the object area blocks in the grid indicating a probability that the object is located in each of the object area blocks. For example, the localization can be predicted by the first localization regressor, as noted above. The first localization regressor can be trained using binary values (based on whether the object is present or not in a given object area block). At run time, the first localization regressor predicts a probability that the object is present in a given object area block. In some cases, the probability is thresholded to a binary value. Further details are provided below with respect to Equations (14) and (15). The object area block from the N×M grid with a highest determined probability is selected for processing by a second stage of the two-level coarse-to-fine object segmentation. As shown in FIG. 9A, the object area block 970 located at row 2, column 3 of the object area map grid is identified as having the highest probability of containing the cat object 520.

Figure 9B:
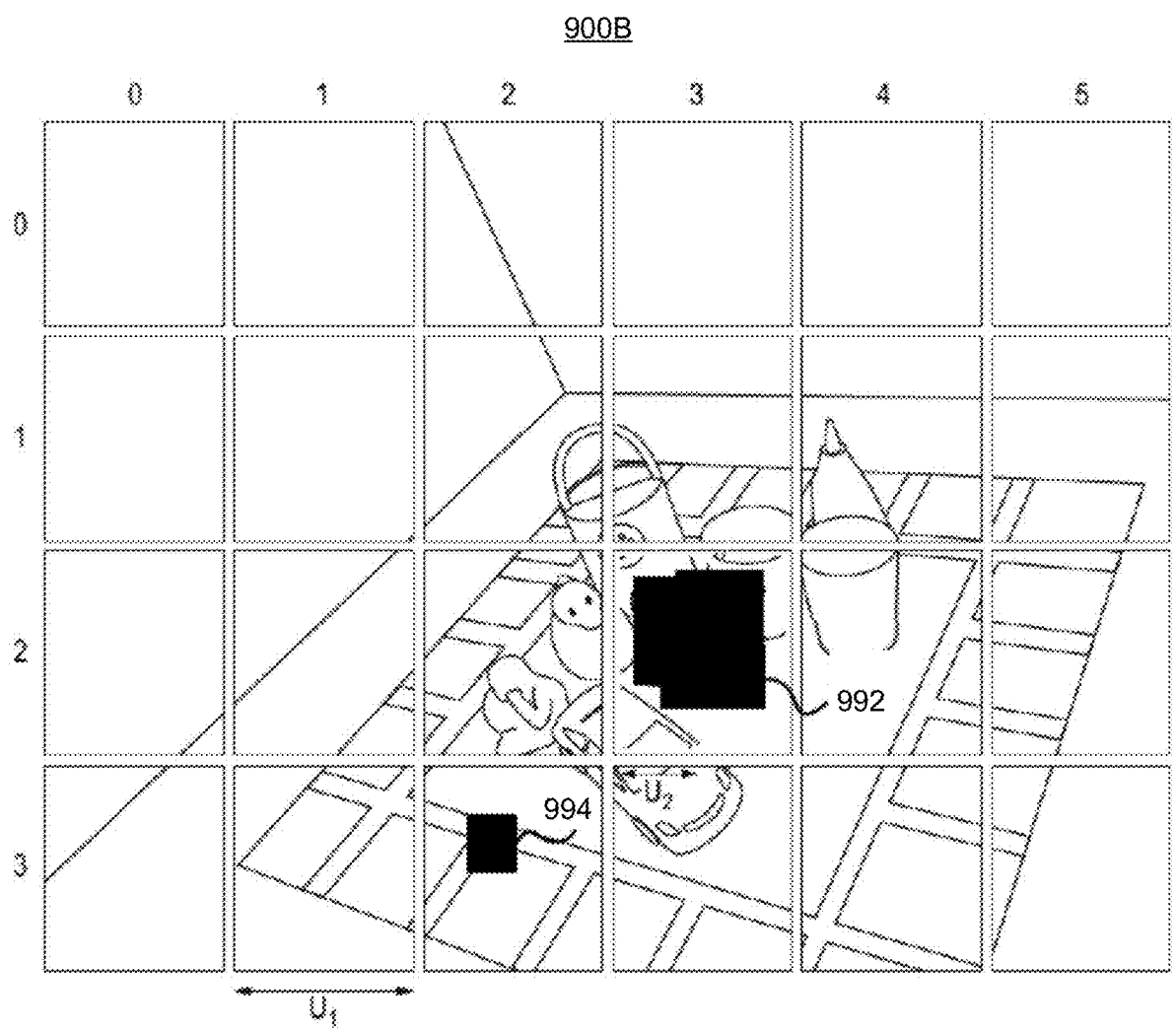
FIG. 9B is an illustration of an image with each region of the image being segmented as a binary mask, in accordance with some examples.

As noted above, the first stage of the segmentation can include training the first localization regressor to provide the low resolution segmentation of the target object given an image region J of a certain size (e.g., 64×64, 128×128, 64×128, or any other suitable size). In some examples, the first stage of the segmentation can be defined as:

$$s_1(J) = h_\phi^1(J) > \tau_1,$$ Equation (14)

where $s_1$ is a binary segmentation of a certain size for J (e.g., a binary mask of 8×8 for an image region J of size 128×128). The term $h_\phi^1$ is a segmentation network. The term $\tau$ is a threshold used to binarize the network's output. To obtain a binary segmentation $S_1$ for the input image, object localization engine 634 can split the input image into regions J and can compute $s_1$ for each region J. The first stage thus provides a binary segmentation $S_1$ for the full input image. FIG. 9B illustrates an example of an image 900B with each region of the image being segmented as a binary mask. Only the largest connected component in $S_1$ is kept. For example, referring to FIG. 9B, the largest connected component is the component 992, which is kept for processing in the second stage of the segmentation. The connected component 994 can be discarded. The object localization engine 634 can then proceed to refine the shape of the connected component 992 by applying the second stage of the segmentation. In some examples, the second stage can be performed using a second localization regressor (e.g., a CNN or the like). The second localization regressor can be the same regressor as the first localization regressor (e.g., the same CNN), or can be a different regressor (e.g., a different CNN).

Figure 9C:
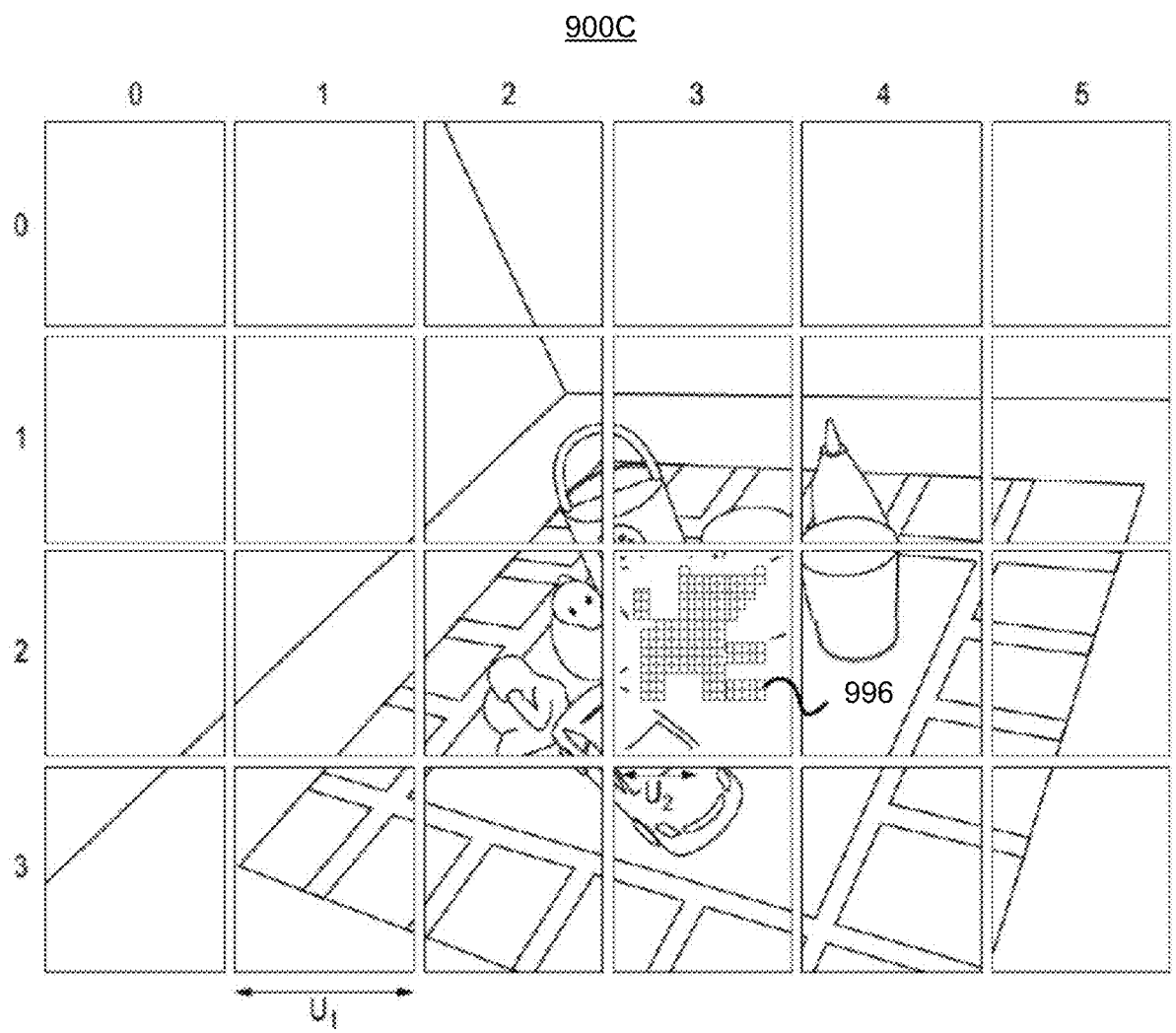
FIG. 9C is an illustration of an image showing application of a second segmentation to get an object segmentation, in accordance with some examples.

The second stage of the segmentation includes applying a second segmentation to get a more accurate object segmentation with an uncertainty of U2 pixels. The 2D center of the object is then the 2D center of the object segmentation. For example, referring to FIG. 9A, the object localization engine 634 can segment the selected object area block 970 into a plurality of object center blocks. The example shown in FIG. 9A has four object center blocks, including object center block 972. A respective probability for each of the object center blocks can then be determined, indicating a probability that a center of the cat object 520 is located in each of the object center blocks. The object localization engine 634 can then select an object center block with a highest determined probability from the object center blocks in the selected object area block. In the example of FIG. 9A, the object center block 972 is selected as the object center block with the highest probability of containing the 2D center of the cat object 520. FIG. 9C illustrates an image 900C showing another example of application of the second segmentation to get an object segmentation 996. For example, using the second segmentation, each active location in the area of the connected component (FIG. 9B) is segmented more finely (e.g., the uncertainty is decreased from, for instance, 16 pixels to 4 pixels).

Figure 9D:
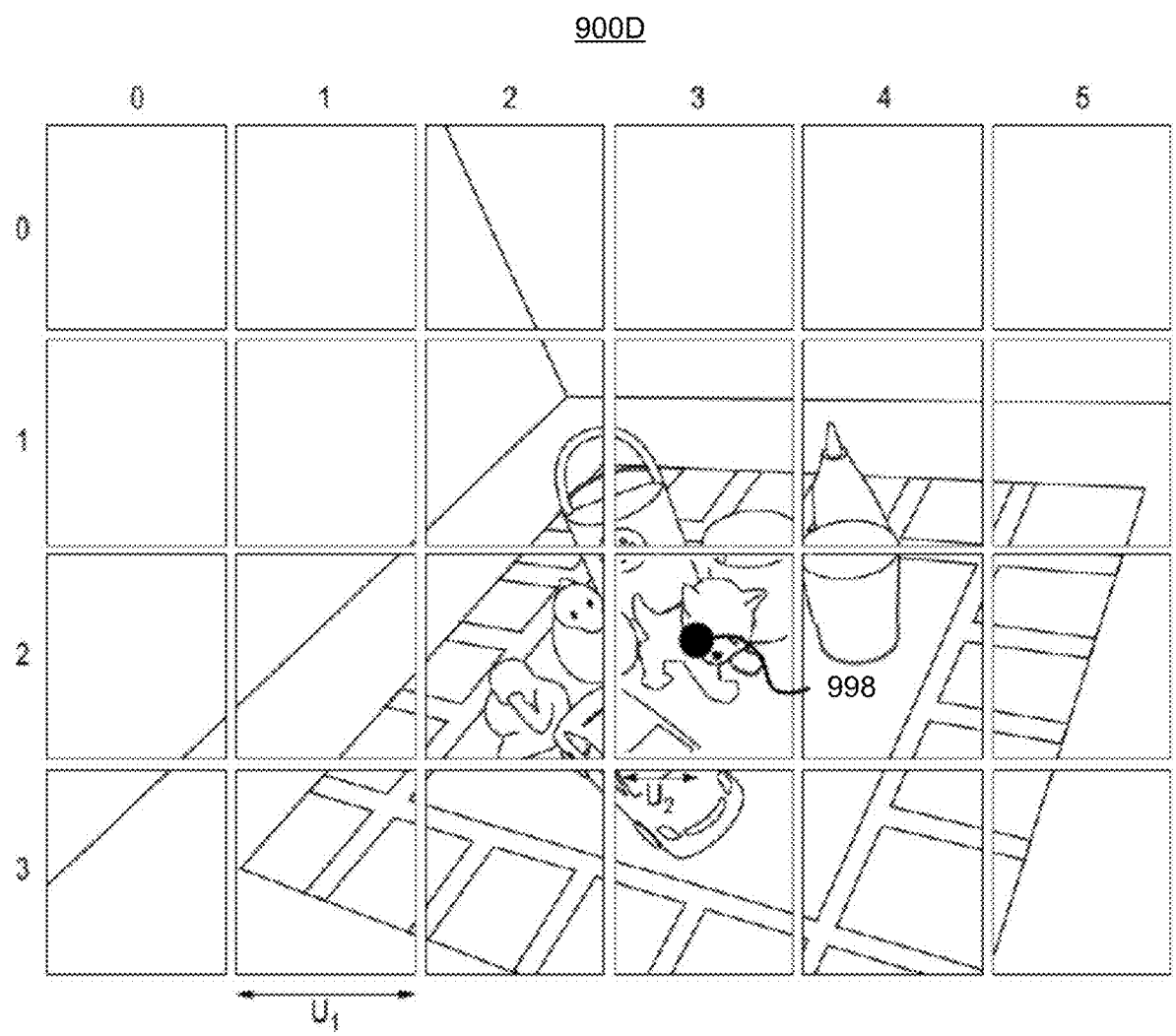
FIG. 9D is an illustration of an image of an object with an estimated object center, in accordance with some examples.

The center of the object in the selected object center block is then determined by the object segmentation. In one example, the centroid of the selected object center block can be used as the center of the object. FIG. 9D illustrates an image 900D with an estimated 2D object center 998. In one example, the centroid of the object segmentation 996 is used as the estimated 2D object center 998. The object localization engine 634 generates the image patch by cropping the image and centering the cropped image on the center of the object. The image 500 shown in FIG. 5 is an example of a cropped image centered on the center of the cat object 520.

As noted above, the result of the first stage can include the binary segmentation $S_1$ for the full input image, based on application of Equation (14) to each image region J. In such examples, only the largest connected component in $s_1$ is kept, and the object localization engine 634 can then proceed to refine its shape. This refinement is done by applying the second stage (e.g., a second CNN) to each image patch P of a certain size (e.g., a 16×16 image patch P) that corresponds to an active location in $S_1$:

$$S_2(P) = h_\psi^2(P) > \tau_2 \qquad \text{Equation (15)}$$

The two stage segmentation thus efficiently computes a binary mask for the target object in the image. The centroid of the binary mask can then be used as the location of the 2D center of the target object.

Figure 10:
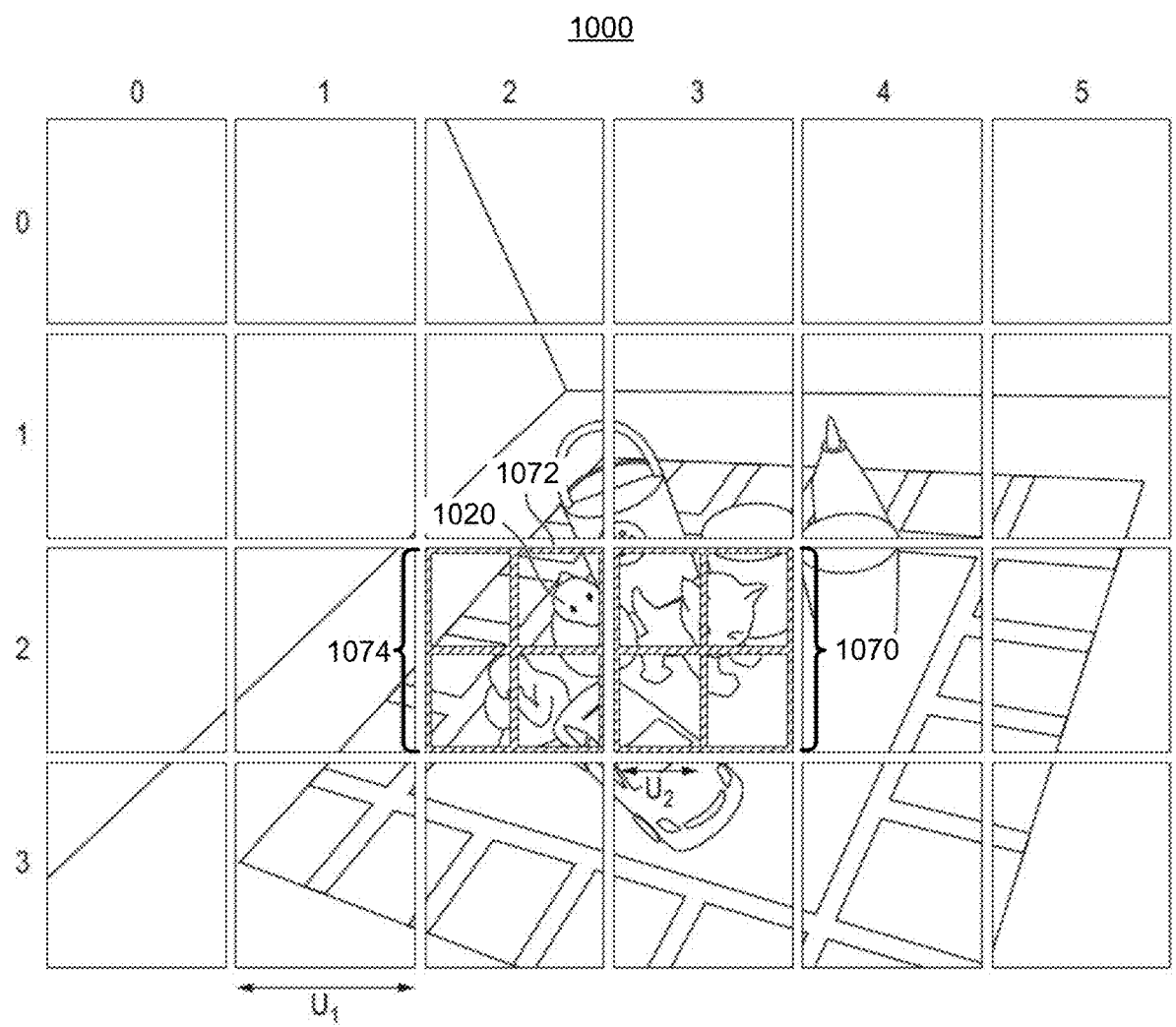
FIG. 10 is an illustration of an image for which another example of target object localization has been performed, in accordance with some examples.

FIG. 10 illustrates another image 1000 after the two-level coarse-to-fine object segmentation has been performed to locate a duck object 1020. In the image 1000, the duck object 1020 is located on the border of two object area blocks 1070 and 1074. In such instances, the second stage of the coarse-to-fine object segmentation can generate two sets of object center blocks, one for each of the object area blocks 1070 and 1074. A probability can be determined for each of the object center blocks indicating a probability that a center of the duck object 1020 is located in each of the object center blocks. The object localization engine 634 can select the object center block that is determined to have the highest determined probability from the object center blocks in two object area blocks 1070 and 1074. In the example of FIG. 10, the object center block 1072 is selected as the object center block with the highest probability of containing the 2D center of the duck object 1020. The center of the object 1020 in the selected object center block is then determined by the object segmentation. The object localization engine 634 can then generate an image patch by cropping the image 1000 and centering the cropped image on the center of the duck object 1020.

A good object localizer can help to prevent losing performance of the predicted pose. As described above, to localize the target object in an image, a two-level coarse-to-fine object segmentation is used. Illustrative examples of the uncertainty terms include U1=16 pixels and U2=4 pixels. In some examples, a classical sliding window approach of size 128×128 for the first segmentation stage. In some cases, this can be efficiently implemented by sharing the convolutions between windows.

In some examples, other object localization methods can be used. One example includes a pixel-wise class labeling method, in which case the encoder weights from the VGG model can be trained on ImageNet. In another example, YOLO can be trained for the object detection task, in which case convolutional weights can be pre-trained on ImageNet.

An example set of generated training images used is 200,000 training images of size 128×128 for both the object location detection and the pose prediction, and 100,000 training images for the refinement. In some examples, the number of training images can be the same for location detection, pose prediction, and refinement. One of ordinary skill will appreciate that any suitable number of training images can be used.

Any suitable architectures for the pose prediction and refinement CNN networks can be used. In one illustrative example, for both the CNN $f_\Theta$ and the CNN $g_\mu$, a 6-layer architecture can be used, in which case the first layer uses 32 7×7 filters and performs a max-pooling of 4×4. The second layer uses 32 5×5 filters and 2×2 max-pooling. The last convolution layer uses 50 3×3 filters without any pooling. Two fully connected layers with 1024 hidden units can follow. The last fully connected layer can output 16 values in the examples in which the pose estimation system 608 predicts 2D projections of 8 vertices of the corners of an object's 3D bounding box, or their 2D updates. The rectified linear unit (ReLU) activation function can be used.

Any suitable architectures can also be used for the network of the object localization engine 634. In one illustrative example, for a first CNN detector used for the first stage of the coarse-to-fine object segmentation, a same architecture as the one described above for the regressor can be used, except for the last layer. The first stage has an uncertainty of $U_1$ pixels (e.g., 8 pixels for an input image of size 128×128 pixels), thus the last connected layer has 64 hidden units. A second CNN detector used for the second stage of the coarse-to-fine object segmentation can have an input of size 16×16, with an uncertainty of $U_2$ pixels (e.g., 4 pixels for the input image of size 128×128). In such an example, a 4-layer CNN would work for the second CNN detector. The first and second layers for both CNN detectors can have 32 and 16 convolutions filter of size 3×3 with no pooling respectively. A fully connected layer with 500 hidden units can be used as the third layer, and last layer can have 16 hidden units. In some examples, the object localization engine 634 can predict a 1 value if a target object has been presented in the interest area (e.g., in an object area block or object center block), or a −1 value if not. In such examples, a tan h activation function can be used for the last layer, which keeps the predicted values in this range.

In some examples, the various parameters of the networks can be optimized with a momentum of 0.9 and a decay of 0.001.

Figure 14:
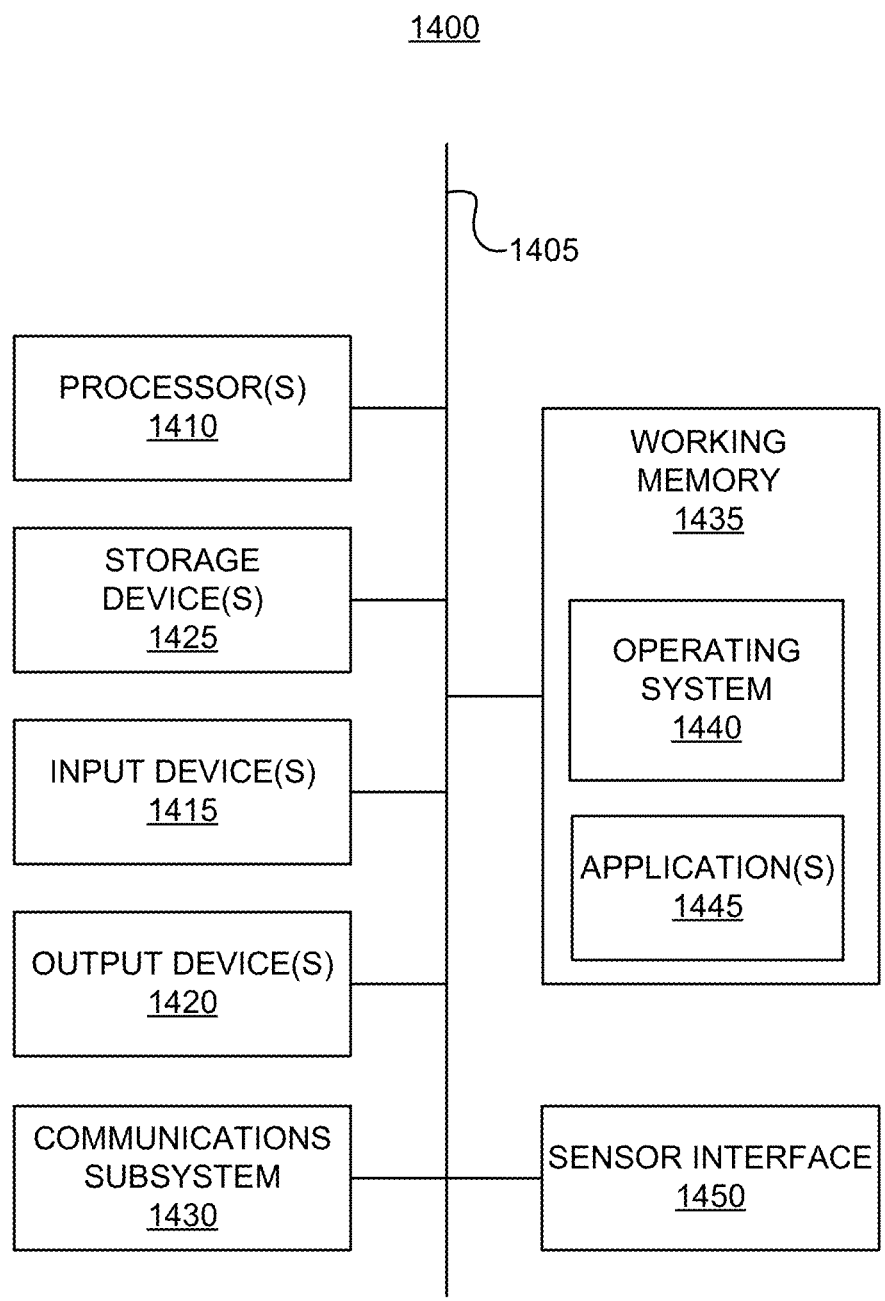
FIG. 14 illustrates an example of a computing system in which one or more embodiments may be implemented.

FIG. 14 illustrates an example computing device 1400 incorporating parts of the device employed in practicing embodiments of the invention. A computing device as illustrated in FIG. 14 may be incorporated as part of any computerized system, herein. For example, computing device 1400 may represent some of the components of a mobile device, or a computing device executing a 3D editing tool. Examples of a computing device 1400 include, but are not limited to, desktops, workstations, personal computers, supercomputers, video game consoles, tablets, smart phones, laptops, netbooks, or other portable devices. FIG. 14 provides a schematic illustration of one embodiment of a computing device 1400 that may perform the methods provided by various other embodiments, as described herein, and/or may function as the host computing device, a remote kiosk/terminal, a point-of-sale device, a mobile multifunction device, a set-top box and/or a computing device. FIG. 14 is meant only to provide a generalized illustration of various components, any or all of which may be utilized as appropriate. FIG. 14, therefore, broadly illustrates how individual system elements may be implemented in a relatively separated or relatively more integrated manner.

The computing device 1400 is shown comprising hardware elements that may be electrically coupled via a bus 1405 (or may otherwise be in communication, as appropriate). The hardware elements may include one or more processors 1410, including without limitation one or more general-purpose processors and/or one or more special-purpose processors (such as digital signal processing chips, graphics acceleration processors, and/or the like); one or more input devices 1415, which may include without limitation a camera, sensors 1450, a mouse, a keyboard and/or the like; and one or more output devices 1420, which may include without limitation a display unit, a printer and/or the like.

The computing device 1400 may further include (and/or be in communication with) one or more non-transitory storage devices 1425, which may comprise, without limitation, local and/or network accessible storage, and/or may include, without limitation, a disk drive, a drive array, an optical storage device, a solid-form storage device such as a random access memory ("RAM") and/or a read-only memory ("ROM"), which may be programmable, flash-updateable and/or the like. Such storage devices may be configured to implement any appropriate data storage, including without limitation, various file systems, database structures, and/or the like.

The computing device 1400 might also include a communications subsystem 1430. The communications subsystem 1430 may include a transceiver for receiving and transmitting data or a wired and/or wireless medium. The communications subsystem 1430 may also include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1430 may permit data to be exchanged with a network (such as the network described below, to name one example), other computing devices, and/or any other devices described herein. In many embodiments, the computing device 1400 will further comprise a non-transitory working memory 1435, which may include a RAM or ROM device, as described above.

The computing device 1400 may comprise software elements, shown as being currently located within the working memory 1435, including an operating system 1440, device drivers, executable libraries, and/or other code, such as one or more application programs 1445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a computer-readable storage medium, such as the storage device(s) 1425 described above. In some cases, the storage medium might be incorporated within a computing device, such as computing device 1400. In other embodiments, the storage medium might be separate from a computing device (e.g., a removable medium, such as a compact disc), and/or provided in an installation package, such that the storage medium may be used to program, configure and/or adapt a general purpose computer with the instructions/code stored thereon. These instructions might take the form of executable code, which is executable by the computing device 1400 and/or might take the form of source and/or installable code, which, upon compilation and/or installation on the computing device 1400 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices 1400 such as network input/output devices may be employed.

Some embodiments may employ a computing device (such as the computing device 1400) to perform methods in accordance with the disclosure. For example, some or all of the procedures of the described methods may be performed by the computing device 1400 in response to processor 1410 executing one or more sequences of one or more instructions (which might be incorporated into the operating system 1440 and/or other code, such as an application program 1445) contained in the working memory 1435. Such instructions may be read into the working memory 1435 from another computer-readable medium, such as one or more of the storage device(s) 1425. Merely by way of example, execution of the sequences of instructions contained in the working memory 1435 might cause the processor(s) 1410 to perform one or more procedures of the methods described herein.

The terms "machine-readable medium" and "computer-readable medium," as used herein, refer to any medium that participates in providing data that causes a machine to operate in a specific fashion. In an embodiment implemented using the computing device 1400, various computer-readable media might be involved in providing instructions/code to processor(s) 1410 for execution and/or might be used to store and/or carry such instructions/code (e.g., as signals). In many implementations, a computer-readable medium is a physical and/or tangible storage medium. Such a medium may take many forms, including, but not limited to, non-volatile media, volatile media, and transmission media. Non-volatile media include, for example, optical and/or magnetic disks, such as the storage device(s) 1425. Volatile media include, without limitation, dynamic memory, such as the working memory 1435. Transmission media include, without limitation, coaxial cables, copper wire and fiber optics, including the wires that comprise the bus 1405, as well as the various components of the communications subsystem 1430 (and/or the media by which the communications subsystem 1430 provides communication with other devices). Hence, transmission media may also take the form of waves (including without limitation radio, acoustic and/or light waves, such as those generated during radio-wave and infrared data communications). In an alternate embodiment, event-driven components and devices, such as cameras, may be used, where some of the processing may be performed in analog domain.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer may read instructions and/or code.

Various forms of computer-readable media may be involved in carrying one or more sequences of one or more instructions to the processor(s) 1410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computing device 1400. These signals, which might be in the form of electromagnetic signals, acoustic signals, optical signals and/or the like, are all examples of carrier waves on which instructions may be encoded, in accordance with various embodiments of the invention.

The communications subsystem 1430 (and/or components thereof) generally will receive the signals, and the bus 1405 then might carry the signals (and/or the data, instructions, etc. carried by the signals) to the working memory 1435, from which the processor(s) 1410 retrieves and executes the instructions. The instructions received by the working memory 1435 may optionally be stored on a non-transitory storage device 1425 either before or after execution by the processor(s) 1410.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional blocks not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of blocks may be undertaken before, during, or after the above elements are considered. Accordingly, the above description does not limit the scope of the disclosure.

What is claimed is:

1. A method of selecting a three-dimensional model, the method comprising:
    obtaining a first input image including an object;
    determining a pose of the object in the first input image;
    obtaining a plurality of candidate three-dimensional models representing one or more objects;
    obtaining a descriptor for the object in the first input image and a plurality of descriptors for the plurality of candidate three-dimensional models;
    determining, from the plurality of candidate three-dimensional models, a candidate three-dimensional model to represent the object in one or more images based on the descriptor for the object in the first input image and the plurality of descriptors for the plurality of candidate three-dimensional models;
    obtaining a second input image including the object in a different pose than the pose of the object in the first input image; and
    adjusting a pose of the candidate three-dimensional model in an output image based on a difference between the pose of the object in the second input image and the pose of the object in the first input image.

2. The method of claim 1, further comprising generating the output image based on the candidate three-dimensional model and the second input image.

3. The method of claim 1, further comprising:
    receiving a user input to manipulate the candidate three-dimensional model; and
    adjusting one or more of a pose or a location of the candidate three-dimensional model in an output image based on the user input.

4. The method of claim 1, wherein the plurality of candidate three-dimensional models represent the one or more objects having a same pose as the determined pose of the object in the first input image.

5. The method of claim 1, further comprising:
    obtaining a plurality of three-dimensional models representing a plurality of objects; and
    selecting a subset of the plurality of three-dimensional models as the plurality of candidate three-dimensional models.

6. The method of claim 5, further comprising:
   determining a category of the object in the first input image; and
   determining one or more categories associated with the plurality of three-dimensional models;
   wherein the subset of the plurality of three-dimensional models are selected from the plurality of three-dimensional models based on the plurality of candidate three-dimensional models having the category of the object in the first input image.

7. The method of claim 1, further comprising:
   obtaining a plurality of images for the plurality of candidate three-dimensional models, wherein the plurality of images are generated to include the one or more objects in a same pose as the determined pose, the plurality of descriptors obtained for the plurality of candidate three-dimensional models being generated from the plurality of images.

8. The method of claim 7, wherein the plurality of images generated for the plurality of candidate three-dimensional models include a plurality of depth maps.

9. The method of claim 1, further comprising:
   comparing the plurality of descriptors obtained for the plurality of candidate three-dimensional models to the descriptor obtained for the object in the first input image; and
   determining a descriptor from the plurality of descriptors that has a closest match to the descriptor obtained for the object in the first input image, wherein the candidate three-dimensional model is determined based on the descriptor from the plurality of descriptors having the closest match to the descriptor obtained for the object in the first input image.

10. The method of claim 9, wherein comparing the plurality of descriptors to the descriptor obtained for the object in the first input image includes: performing a nearest-neighbor search using the descriptor obtained for the object in the first input image as input.

11. The method of claim 1, wherein the plurality of candidate three-dimensional models include a plurality of three-dimensional meshes representing the one or more objects.

12. The method of claim 1, wherein determining the pose of the object in the first input image includes:
   determining a plurality of two-dimensional projections of a three-dimensional bounding box of the object in the first input image; and
   estimating the pose of the object using the plurality of two-dimensional projections of the three-dimensional bounding box.

13. The method of claim 12, wherein the plurality of two-dimensional projections of the three-dimensional bounding box are determined by applying a trained convolutional network to the first input image, wherein the trained convolutional network is trained to predict two-dimensional projections of the three-dimensional bounding box of the object in a plurality of poses.

14. The method of claim 12, wherein estimating the pose of the object using the plurality of two-dimensional projections of the three-dimensional bounding box includes applying a perspective-n-point (PnP) problem using correspondences between the plurality of two-dimensional projections and three-dimensional points of the three-dimensional bounding box that correspond to the plurality of two-dimensional projections.

15. The method of claim 1, further comprising:
   obtaining an additional input image, the additional input image including the object in a different location than a location of the object in the first input image or the second input image; and
   adjusting a location of the candidate three-dimensional model in at least one output image based on a difference between the location of the object in the additional input image and the location of the object in the first input image or the second input image.

16. An apparatus for selecting a three-dimensional model, comprising:
   a memory configured to store one or more images; and
   a processor configured to:
      obtain a first input image including an object;
      determine a pose of the object in the first input image;
      obtain a plurality of candidate three-dimensional models representing one or more objects;
      obtain a descriptor for the object in the first input image and a plurality of descriptors for the plurality of candidate three-dimensional models;
      determine, from the plurality of candidate three-dimensional models, a candidate three-dimensional model to represent the object in one or more images based on the descriptor for the object in the first input image and the plurality of descriptors for the plurality of candidate three-dimensional models;
      obtain a second input image including the object in a different pose than the pose of the object in the first input image; and
   adjust a pose of the candidate three-dimensional model in an output image based on a difference between the pose of the object in the second input image and the pose of the object in the first input image.

17. The apparatus of claim 16, wherein the processor is configured to generate the output image based on the candidate three-dimensional model and the second input image.

18. The apparatus of claim 16, wherein the processor is configured to:
   receive a user input to manipulate the candidate three-dimensional model; and
   adjust one or more of a pose or a location of the candidate three-dimensional model in an output image based on the user input.

19. The apparatus of claim 16, wherein the plurality of candidate three-dimensional models represent the one or more objects having a same pose as the determined pose of the object in the first input image.

20. The apparatus of claim 16, wherein the processor is configured to:
   determine a category of the object in the first input image; and
   determine one or more categories associated with a plurality of three-dimensional models;
   selecting a subset of the plurality of three-dimensional models from the plurality of three-dimensional models based on the plurality of candidate three-dimensional models having the category of the object in the first input image.

21. The apparatus of claim 16, wherein the processor is configured to:
   obtain a plurality of images for the plurality of candidate three-dimensional models, wherein the plurality of images are generated to include the one or more objects in a same pose as the determined pose, the plurality of descriptors obtained for the plurality of candidate three-dimensional models being generated from the plurality of images.

22. The apparatus of claim 21, wherein the plurality of images generated for the plurality of candidate three-dimensional models include a plurality of depth maps.

23. The apparatus of claim 16, wherein the processor is configured to:
compare the plurality of descriptors obtained for the plurality of candidate three-dimensional models to the descriptor obtained for the object in the first input image; and determine a descriptor from the plurality of descriptors that has a closest match to the descriptor obtained for the object in the first input image, wherein the candidate three-dimensional model is determined based on the descriptor from the plurality of descriptors having the closest match to the descriptor obtained for the object in the first input image.

24. The apparatus of claim 16, wherein determining the pose of the object in the first input image includes:
determining a plurality of two-dimensional projections of a three-dimensional bounding box of the object in the first input image; and
estimating the pose of the object using the plurality of two-dimensional projections of the three-dimensional bounding box.

25. The apparatus of claim 24, wherein estimating the pose of the object using the plurality of two-dimensional projections of the three-dimensional bounding box includes applying a perspective-n-point (PnP) problem using correspondences between the plurality of two-dimensional projections and three-dimensional points of the three-dimensional bounding box that correspond to the plurality of two-dimensional projections.

26. The apparatus of claim 16, further comprising a camera for capturing the one or more images.

27. The apparatus of claim 16, wherein the apparatus comprises a mobile device with a camera for capturing the one or more images.

28. The apparatus of claim 16, further comprising a display for displaying the one or more images.

29. The apparatus of claim 16, wherein the processor is configured to:
obtain an additional input image, the additional input image including the object in a different location than a location of the object in the first input image or the second input image; and
adjust a location of the candidate three-dimensional model in at least one output image based on a difference between the location of the object in the additional input image and the location of the object in the first input image or the second input image.

30. A non-transitory computer-readable medium having stored thereon instructions that, when executed by one or more processors, cause the one or more processors to:
obtain a first input image including an object;
determine a pose of the object in the first input image;
obtain a plurality of candidate three-dimensional models representing one or more objects;
obtain a descriptor for the object in the first input image and a plurality of descriptors for the plurality of candidate three-dimensional models;
determine, from the plurality of candidate three-dimensional models, a candidate three-dimensional model to represent the object in one or more images based on the descriptor for the object in the first input image and the plurality of descriptors for the plurality of candidate three-dimensional models;
obtain a second input image including the object in a different pose than the pose of the object in the first input image; and
adjust a pose of the candidate three-dimensional model in an output image based on a difference between the pose of the object in the second input image and the pose of the object in the first input image.

* * * * *